March 5, 1957 G. L. BRIGGS 2,783,981
PRODUCTION OF COMBUSTIBLE MIXTURE OF AIR AND FUEL VAPOR
Filed Oct. 21, 1953 4 Sheets-Sheet 1

INVENTOR.
GEORGE L. BRIGGS.
BY
William T. Kriesmer
ATTORNEY

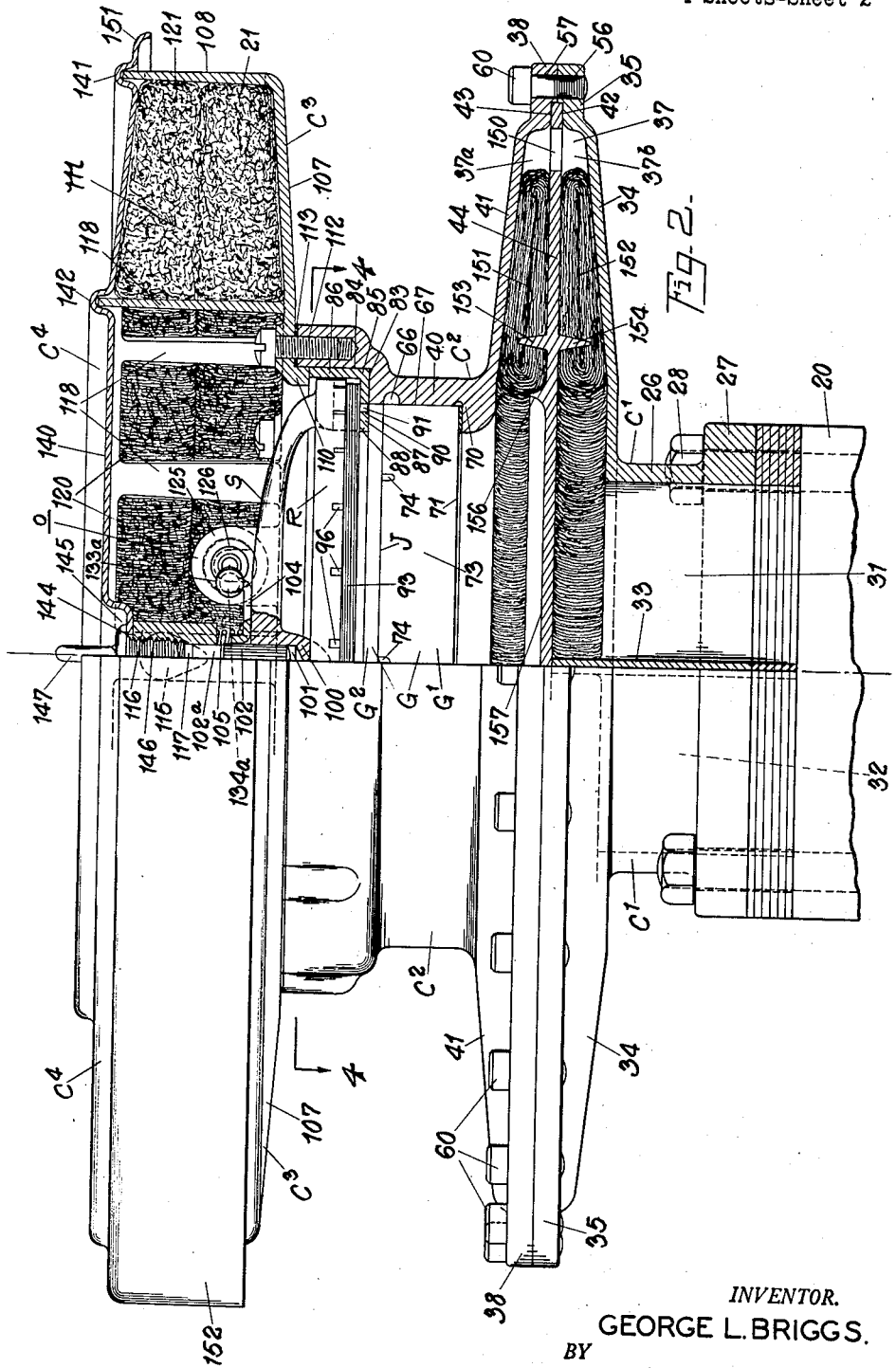

March 5, 1957
G. L. BRIGGS
2,783,981
PRODUCTION OF COMBUSTIBLE MIXTURE OF AIR AND FUEL VAPOR
Filed Oct. 21, 1953
4 Sheets-Sheet 3
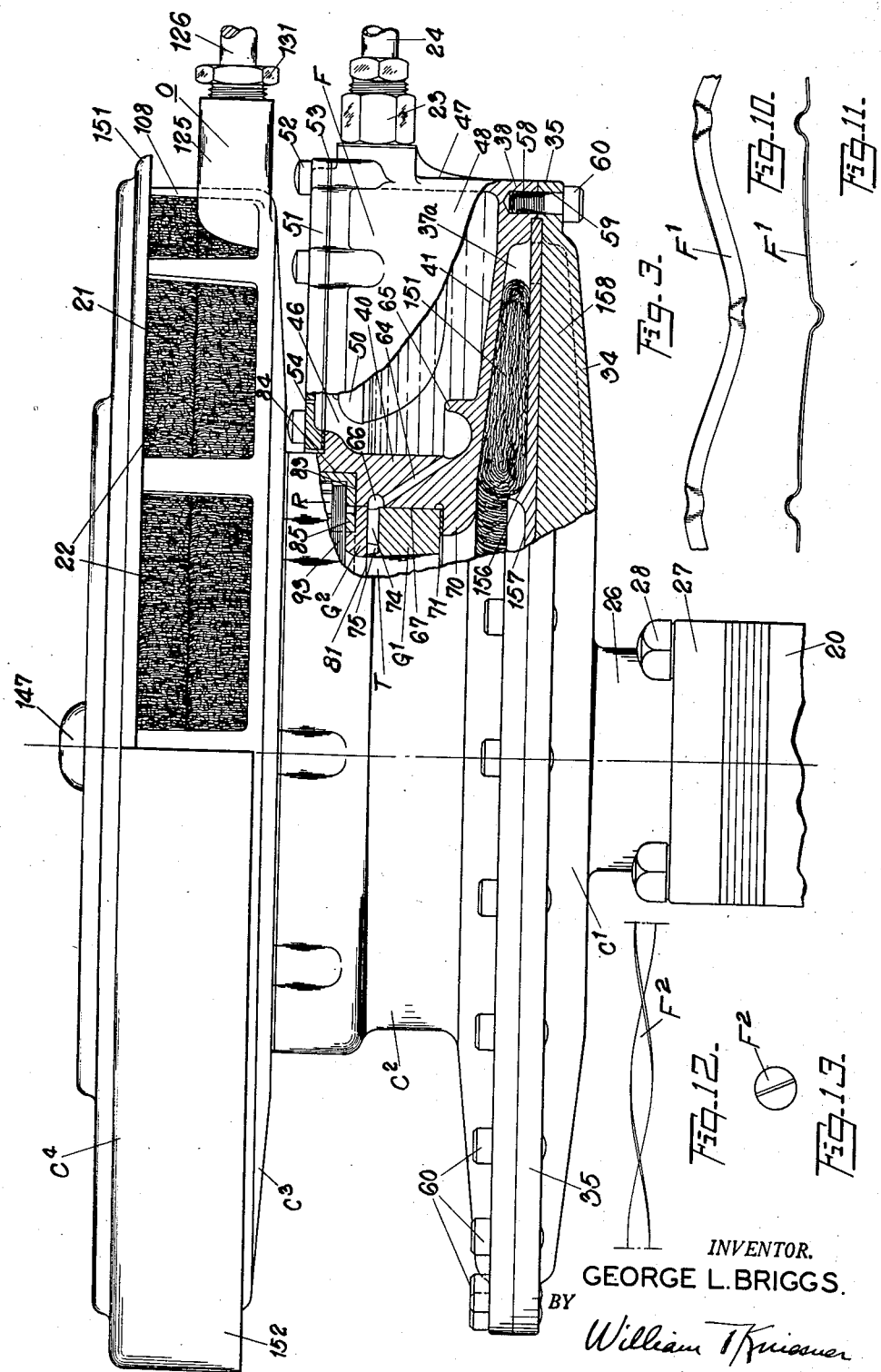
INVENTOR.
GEORGE L. BRIGGS.
BY William T. Kriesmer
ATTORNEY

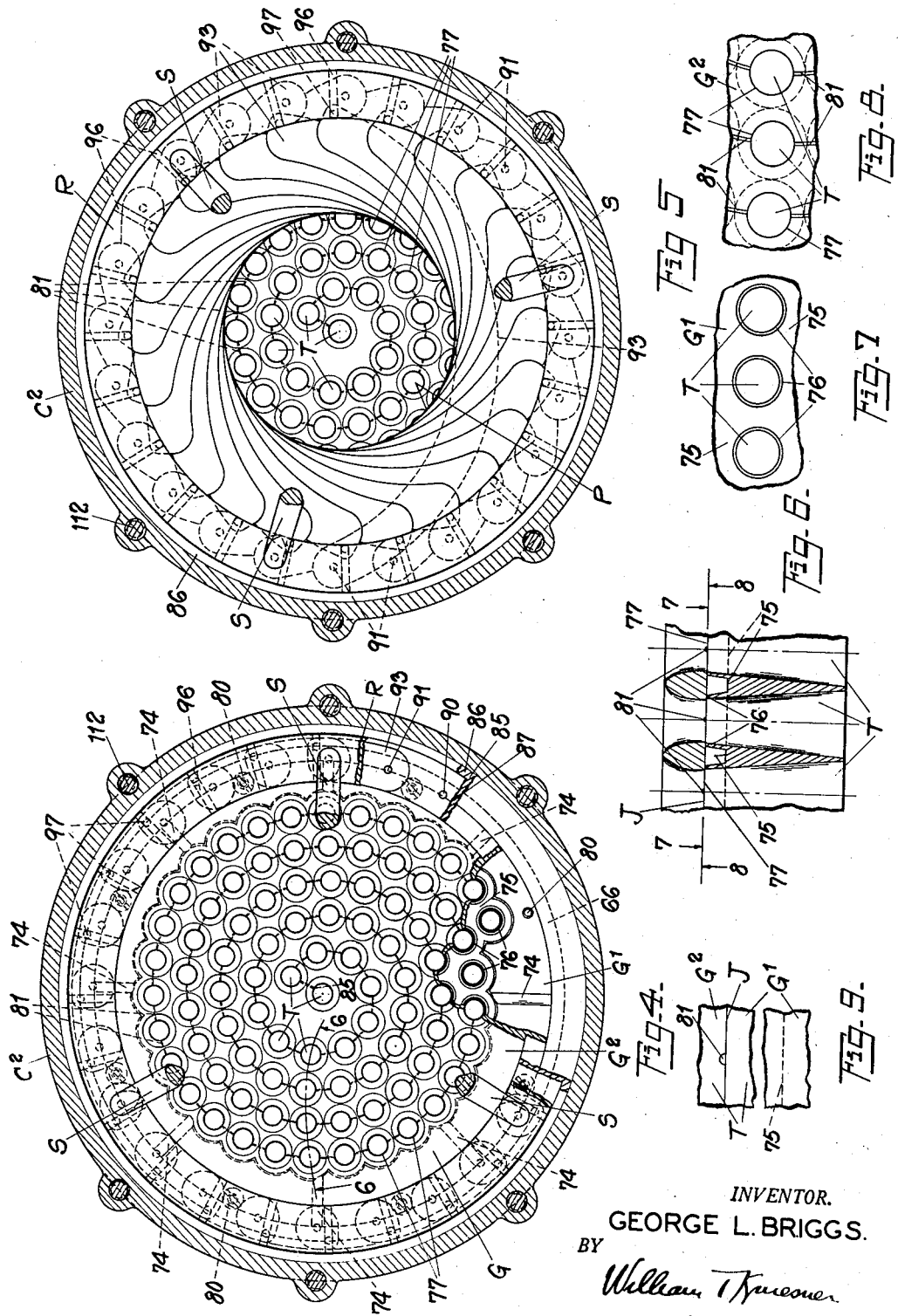

United States Patent Office 2,783,981

Patented Mar. 5, 1957

2,783,981

PRODUCTION OF COMBUSTIBLE MIXTURE OF AIR AND FUEL VAPOR

George L. Briggs, White Plains, N. Y., assignor to Briggs Research & Development, Inc., White Plains, N. Y., a corporation of New York Application October 21, 1953, Serial No. 387,464

35 Claims. (Cl. 261—23)

This invention relates to the production of a combustible mixture of air and fuel vapor, as, for example, for supply to an internal combustion engine, such as a motor vehicle engine.

One of the objects of this invention is to provide a practical and efficient method and apparatus for supplying dependably an appropriate admixture of clean air and fuel vapor, free from detrimental liquid components, as for combustion in an internal combustion engine such as a gasoline-powered automotive engine, in a manner and at controllably variable rates to suit the varying demands or requirements, such as for changes in speed or power output, met with in practice. Another object is to provide a method and means of the above-mentioned character that can be carried out in practice by way of a structure well adapted for quantity production, with parts which can be individually manufactured efficiently and economically, and assembled, preferably to include easily assembled subassemblies, in simple and reliable manner and in sequencies that lend themselves effectively to so-called assembly-line manufacture. Another object is to carry out this last-mentioned object in a manner, and by structural features, to permit easy and fool-proof access to the interior of the structure for purposes such as replacement of certain parts.

Another object is to provide a means and method of the above-mentioned character in which, contrary to known practices, venturi-type of air-tubes with liquid-fuel inlet jets may be effectively employed for atomization of liquid-fuel, in small individual increments and decrements according to varying increase or decrease in demand for fuel-vapor and air mixture while maintaining in spite of such varying demands high or optimum efficiency and substantial uniformity of action of each, with minimum or no material risk of passing on to the engine manifold detrimental liquid components of the fuel. Another object is to carry out this last-mentioned object by structural features which are well adapted for practical and economical manufacture and which can coact and controllably function in such individual increments and decrements so as to better suit the demand characteristic of the internal combustion engine or other mixture-consuming device or apparatus.

Another object is to provide a method and means of the above character in which smoothness and speed of response to varying demands for fuel-vapor and air mixture may be achieved in a practical and efficient manner; more particularly, to lessen or eliminate detrimental effects and reactions such as, in known arrangements, are caused by inertia of a column or volume of air or of air mixed with atomized liquid fuel, when the manifold calls for marked increase or greater demand for combustible mixture; and to provide for pre-conditioning Venturi-type air-tubes and feul-jets, preferably progressively, over and above those already functioning so as to ready them for incremental and prompt response to increased demand.

Other objects are to provide improved means and method for producing a combustible mixture of air and fuel-vapor to meet varying demands and to do so in a thoroughly practical, efficient and dependable manner and by compact, reliable and efficiently-functioning apparatus. Other objects will be in part obvious or in part pointed out hereinafter.

The invention accordingly consists in the features of construction, combination of elements, arrangements of parts and in the several steps and relation and order of each of the same to one or more of the others thereof, all as will be illustratively described herein, and the scope of the application of which will be indicated in the following claims.

In the accompanying drawings, in which are illustratively shown the mechanical features of a preferred embodiment of my invention and in which similar reference characters refer to similar parts throughout the several views, Figure 1 is a top plan view, with certain parts broken away in the lower left-hand quadrant to show certain internal parts more clearly in plan, of a completely assembled carburetor unit of my invention, comprising air-intake with air-cleaner, the carburetion elements, and vaporizer;

Figure 2 is a front elevation thereof, partly in vertical section, as seen from the left in Figure 1 and along the section line 2—2 of Figure 1, showing the complete and compact unit attached to a conduit or pipe, such as the intake manifold of an internal combustion engine, for supply of fuel-air mixture to the place of consumption;

Figure 3 is a side elevation as seen from the bottom of Figure 1 and as seen from the right in Figure 2, certain parts being broken away or omitted in order to show certain other parts in central vertical cross-section;

Figure 1:
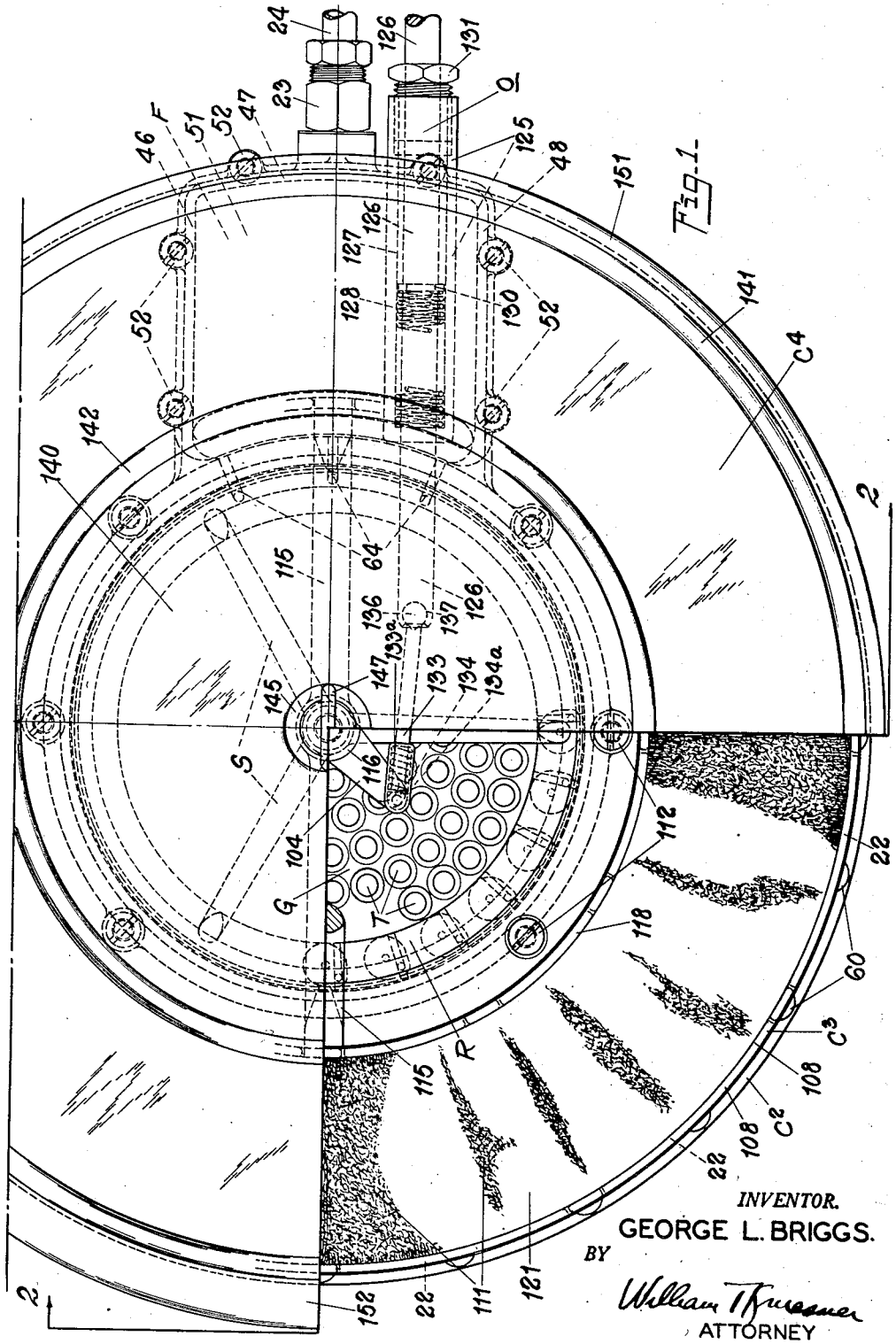

Figure 4 is a horizontal cross-section view as seen along the line 4—4 of Figure 2, showing in plan, with parts partially broken away to show more clearly certain coacting underlying structural parts, a preferred and illustrative geometric interrelation of liquid fuel jets, air-flow tubes and a variable diaphragm control therefor, with the elements of the diaphragm shown in full-open or maximum flow positions;

Figure 5 is a horizontal cross-sectional view also along the line 4—4 of Figure 2 showing, by contrast to the full-open relation of parts shown in Figure 4, the variable-opening diaphragm parts in positions intermediate of closed and full-open;

Figure 6 is a fragmentary vertical sectional view, on an enlarged scale, as seen along the line 6—6 of Figure 4, showing in full cross-section the structural features of one air-flow tube and one liquid fuel jet passage associated therewith and showing fragmentarily, also in cross-section, two respectively adjacent air-flow tubes and their respective liquid fuel jets, together with structural features showing supply channels or passages for liquid fuel to the jet passages;

Figure 7 is an elevational plan view thereof, also partly broken away, taken on the plane of the junction of parts that make up the air-flow tube assembly and looking in the direction of the arrows on line 7—7 of Figure 6;

Figure 8 is an elevational plan view thereof, also partly broken away, taken on the plane of the junction of parts that make up the air-flow tube assembly and looking in the direction of the arrows on line 8—8 of Figure 6;

Figure 9 is a fragment, on a greatly enlarged scale, of the view shown in Figure 6, but showing only so much of the latter as portrays the exit end of a liquid fuel jet passage into one of the air-flow tubes;

Figure 10 is a plan view, greatly enlarged, of a portion of a filament;

Figure 11 is a side elevation of the filament portion shown in Figure 10;

Figure 12 is side elevation of a portion of another form of filament; and

Figure 13 is an end elevation thereof.

My invention is best illustrated and described in connection with the preparation and supply of a combustible fuel-air mixture to uniformly meet the widely varying demands therefor of an internal combustion engine which is well illustrated in the internal combustion engines used for automobile propulsion and in which the initial source of fuel is liquid form, such as gasoline. It is well recognized that, in such installations, a number of operating conditions or requirements, such as for example rapid engine speed acceleration, impose peculiar difficulties upon carburetion of the liquid fuel and that these and other difficulties are not overcome by heretofore known methods and devices for carburetion; moreover such devices are in many instances of complicated construction and hence are costly in manufacture and maintenance, and oftentimes, in their action, amount to compromise between various different engine conditions or requirements with the result that efficiency of action and operation as well as economy are widely variable.

In the drawings I have illustrated my device in a form well adapted for automotive gasoline engine use and adapted for attachment to or mounting upon the engine intake manifold which is indicated at 20 in Figures 2 and 3, and as I proceed with the description of the device its compactness and simplicity of construction will better appear, so much so that, in the preferred embodiment, I am enabled compactly to associate with and into the construction suitable air-cleaning or filtering means generally indicated, in Figures 2 and 3, at 21 and appropriately related to air inlet apertures or openings 22 of large air-flow capacity, with provision, as indicated at 23 (Figure 3), for connecting to the device the liquid-fuel supply pipe 24, leading from a suitable tank or source of supply of appropriate liquid fuel such as gasoline.

As will also be made clear as the description proceeds, I provide external casing or enclosure-forming parts and internal coacting parts and elements so constructed as to facilitate and economize in manufacture of individual parts and to provide for efficiency, ease, and dependability of assembly thereof as well as ultimate facility of access to internal parts or elements of the completed device. While in preferred form assembly proceeds in a manner to expedite quantity production and particularly for so-called "assembly-line" mass production, this advantage is gained without handicapping or destroying ease of accessibility to interior parts for purposes of maintenance or replacement of certain elements when the device is in actual installed use, as in a motor car.

Thus, I provide a base or bottom casing section $C^1$ (Figures 2 and 3) which has a downwardly projecting part 26 which is shaped to provide a central outlet passage or efflux orifice of appropriate cross section and which, at its lower end, is provided with any suitable means such as a lateral peripheral flange 27 for making sealed connection with the intake manifold 20 as by a suitable number of securing bolts 28. The part 26 and its internal passage are coaxial with the central vertical axis of the entire structure and may be given any desired shape of cross-section. They and the securing flange 27 may be circular as when used in place of so-called single-throat carburetors or, as in the illustrative embodiment, they may be of elongated cross-section, to provide two efflux passages for supply of mixture to two banks of engine cylinders. Externally part 26 and flange 27 may be of rectangular cross-section, having a major horizontal axis or dimension as shown in Figure 2 and a minor horizontal axis or dimension as shown in Figure 3, and internally the outlet passage is divided, as shown in Figure 2, along the minor axis, preferably in a manner later more clearly described, so as to form two parallel efflux passages 31 and 32 of round cross-section, each to one side of a vertical divider plate or web 33 that is aligned with the above-mentioned minor axis of the part 26.

Whatever the cross-sectional shape of the part 26 of the bottom casing section $C^1$, the latter extends laterally from the upper end of the part 26, as shown at 34, to terminate in a relatively heavy circular peripheral flange 35 which is of substantially greater diameter (Figures 2 and 3) than the major cross-sectional dimension of the part 26 of casing section $C^1$, and as shown, an outer portion of substantial radial dimension of the part 34 can incline upwardly and outwardly, being substantially frusto-conical.

The part 34 is to form the bottom wall of a relatively large-diametered internal annular chamber generally indicated by the reference character 37 and the heavy peripheral flange 35 forms a dependable annular seat for supporting a companion flange 38 of an intermediate casing section generally indicated by the reference character $C^2$; the latter comprises a cylindrical part 40 which, at its lower end, is joined to the flange 38 by an outwardly and downwardly inclined wall 41 that is companion to the frusto-conical portion of the wall 34 and forms with the latter the above mentioned internal annular chamber 37.

As better appears from Figure 2, the companion peripheral flanges 35 and 38 are preferably of substantial thickness, not only to provide the desired vertical spacing between the opposed frusto-conical walls 34 and 41 but also to facilitate the forming therein of opposed annular seats 42 and 43, each of a vertical dimension or depth equal to about half the thickness of a disk-like baffle plate 44 that extends horizontally in the midplane between the walls 34 and 41, dividing the annular chamber 37 into an upper annular chamber $37^a$ and a lower annular chamber $37^b$ of substantially identical shape and volume. In assembly, the baffle 44 is laid down so that its peripheral portion becomes seated in the flange seat 42, being thereby centered with the casing section $C^1$, so that when the intermediate casing section $C^2$ is brought over the bottom section $C^1$, the upwardly projecting peripheral portion of the baffle 44 is received within the upper seat 43 of flange 38 and thereby casing section $C^2$ becomes coaxially aligned with the bottom casing section $C^1$, and the two casing sections are thereby prevented from relative lateral shift. At the same time peripherally distributed holes in the flanges 35 and 38, adapted for the reception of securing screws later described, are easily brought into respective alignments to facilitate securing the two casing sections $C^1$ and $C^2$ together, but since, in the illustrative device here shown for automotive engine purposes the device has a front and back with relation to the longitudinal axis of the vehicle, I make facile provision for securing the two casing sections $C^1$ and $C^2$ together in the desired relative rotative positions about their common vertical axis, all as later described.

As is better shown in Figures 3 and 1, I form, integrally with the cylindrical wall 40 of casing section $C^2$ and integrally with the wall 41 and flange 38, upstanding side and end walls 46, 47 and 48, as by casting them integrally with the intermediate casing section $C^2$, to form a float-valve chamber F of appropriate liquid fuel capacity; the above described coupling 23 for the fuel supply pipe 28 is associated with the end wall 47 of the float-valve chamber F; the float itself is shown at 50 and it and the needle valve which it usually controls can be of any desired or known construction and need not be further described or indicated. The float chamber F has a top closing plate 51 (Figure 3) secured by screws 52 (see also Figure 1) threaded into bosses formed in the upstanding walls 46, 47 and 48, with a suitable gasket 53 (Figure 3) interposed between the periphery of the cover plate 51 and the top edges of the walls including a ledge formed externally on the casing wall 40 as is better shown in Figure 3. The top plate 51 has a suitable air vent 54.

Preferably the float chamber F is, in relation to the front and rear of the vehicle, at the back or trailing end of the device when installed and for symmetry of construction and arrangement, the center line of the pipe coupling 23 (Figures 1 and 3), and hence also the longitudinal center line of the float chamber F, are along a radius of the intermediate casing section $C^2$ and, for assembly purposes, they are to fall into a vertical plane transverse to the vertical plane through the major axis of part 26 and the divided efflux passages 31—32 of the bottom casing section $C^1$ (Figure 2). To facilitate this orientation during assembly, I provide, in the flange 35 of lower casing section $C^1$, uniformly distributed threaded holes 56 and in the flange 38 of the intermediate casing section $C^2$ I provide similarly distributed unthreaded holes 57, excepting throughout that relatively short arcuate portion of flange 38 that underlies the float chamber wall 47 (see Figures 1 and 3), and throughout the last mentioned portion of flange 38 I provide threaded holes 58 in flange 38 and unthreaded holes 59 in the flange 35. With this arrangement, once the casing section $C^2$ is set down upon the bottom casing section $C^1$ and is centered therewith by the baffle plate 44 as above described, it becomes impossible to apply the securing screws to clamp the two casing sections together excepting when the two casing sections are properly oriented, about their common axis, in the relationship above described, for the securing screws 60, most of which have to be threaded downwardly into the threaded holes 56 of the bottom flange 35 and only a few of them threaded upwardly into the threaded holes 58 underlying the float chamber wall 47 (see Figure 3), cannot be threaded home unless the two casing parts are properly oriented.

Float 50 in the float-valve chamber F maintains, in usual manner, the desired depth or head of liquid fuel in the chamber; from a point near the bottom of the chamber, there extends an upwardly and inwardly inclined passage 64, through the relatively heavy cylindrical wall 40 of the intermediate casing section $C^2$. The intake end of fuel passage 64 is protected, as against sedimentation, by a baffle 65 upstanding from the chamber bottom and also by the inclination downwardly and away, of the float chamber bottom itself. The upper end of fuel passage 64 leads into a circumferentially extending distributing channel 66 which is formed about the entire circumference of the inside cylindrical face 67 of the wall part 40 and is therefore annular; it may be formed therein as by turning, as in a lathe, to cut or form the channel as a circumferential groove, in the inside cylindrical face of the wall 40 of the desired cross-sectional area. Since, as later described, it serves as a supply and distributing channel for the liquid fuel, it preferably has relatively substantial flow capacity and, for example, where the diameter of the inside cylindrical face 67 of the heavy wall 40 is on the order of 4 3/16 inches, the inside annular channel 66 may be turned, as by a round nosed tool, to have a depth and radial dimension of about 1/8 of an inch and a vertical dimension or width in the face 67 of about 1/8 of an inch. To supply liquid fuel at adequate rate from the float chamber F, I preferably provide more than one passage 64 (see Figures 3 and 1) and these I preferably distribute appropriately throughout so much of the cylindrical wall part 40 as is common to the annular supply channel 66 and the float chamber F, and in Figure 1 I have shown three spaced or distributed connecting passages 64 for supplying the annular channel 66 at suitably distributed points. The channels 64 are easily formed as by drilling, as appears clearly from Figure 3. As is better shown in Figures 3 and 1, the intermediate casing section $C^2$ has formed, near the lower end of the cylindrical wall 40, an internal annular shoulder 70 that provides a horizontal upper supporting ledge or seat from the inner periphery of which the surface of the annular shoulder 70 extends downwardly and outwardly in a smooth curved surface of revolution for ease of flow and guidance downwardly and radially outwardly, of mixture of air and fuel vapors and particles, into the inner annular end of the upper annular chamber $37^a$ between the frusto-conical wall 41 and the underlying upper surface portion of baffle 44. On the ledge 70 is positioned a ring gasket 71 of suitable gasket material and resting on top of the gasket and snugly received, with a sliding fit, by the cylindrical face 67 of wall part 40 is a disk-like grid, designated as a whole by the reference character G, of substantial thickness or axial dimension and preferably comprising two disk-like parts $G^1$ and $G^2$, one above the other, and constructed, illustratively as is about to be described, to provide a multiplicity of vertically extending air-flow tubes or tube-like passages, with fuel jet passages opening into the vertical air-tube passages. The two parts $G^1$ and $G^2$ are the same diameter of external cylindrical surface and they are held concentrically with each other and with the other parts of the device by the snug interfitting of their external cylindrical surfaces with the internal cylindrical surface 67 of the wall part 40.

In Figure 4, is shown in plan view an illustrative and preferred arrangement of the multiplicity of vertically extending air-tubes T; they are of circular cross-section, their axes are vertical and parallel to each other, and they preferably occupy a substantial central circular area of the grid structure G, leaving an outer annular marginal area of appropriate radial dimension, for a purpose later described. Preferably they are distributed, beginning at the center or vertical axis of the grid structure G, in a spiral; in the illustration the spiral is of about five spires, with the pitch of the spires about 0.312 inch and with the tubes T pitched, that is, center to center, on the spires at about 0.312 inch, for the illustrative tube dimensions given below.

The tube passages T are preferably identically dimensioned and preferably their walls are shaped to conform to the Venturi principle for most efficient coaction with other parts and particularly with the liquid fuel which I arrange to be supplied to each tube passage T at a suitable point or points in the side wall of each and, where the tube passage is Venturi-shaped, these points are preferably located at or adjacent to the locus of best pressure differential or suction. Usually these points will be at or adjacent to the throat or at the smallest inside diameter of the Venturi tube. In the illustrative embodiment shown in the drawings I so proportion and shape the walls of the Venturi tube T that the points at which the liquid fuel jet-passages open into the Venturi tubes T fall substantially in the plane of the junction J between the lower grid part $G^1$ and the upper grid $G^2$, as is shown in Figure 6 and later described in detail, thus greatly to facilitate construction thereof and of other features about to be described. By reference to Figure 2 it will be seen that the horizontal plane of the junction between the upper and lower grid parts $G^2$ and $G^1$ falls substantially in the plane of the upper bounding edge of the internal circumferential liquid-fuel supply passage 66 whose otherwise open side is closed off by the external cylindrical face 73 of the lower grid part $G^1$, excepting where the latter has formed, in its upper face, radially-inwardly extending channels 74 of which the outer open ends of two of them are shown in Figure 2 and of which one of them is shown in cross-section in Figure 3. These channels 74 are of a depth about equal to the vertical dimension of the circumferential distributing channel 66. In Figure 4, where a portion of the upper grid part $G^2$ is broken away, one of these channels 74 is shown in elevation; they are in number sufficient to provide adequate rate of liquid-fuel flow radially inward to supply the jet-passages later described, and they may be substantially uniformly distributed or equiangularly spaced as is indicated in Figure 4, where they are shown in broken lines where they underlie the upper grid part $G^2$. As above described the Venturi tubes T, being arranged within a substantially circular area of lesser diameter or expanse than that of the grid structure G, leave an outer annular marginal portion or region of the grid parts $G^1$ and $G^2$ free from air tube passages, and the radially extending channels 74 in the lower grid part $G^1$ are of such lengths as to just cross this plane marginal portion of the lower grid part $G^1$ and their otherwise open upper sides are closed by the flat or plane marginal under-surface of the upper grid part $G^2$, as is clearly shown in Figure 3.

The inner ends of these radial channels 74 open into the generally circular area throughout which the Venturi tubes T are distributed and for this purpose that area of the upper face of the lower grid part $G^1$ is depressed to a depth about equal to the depth of the channels 74, excepting at each air-tube passage the walls of which terminate in the plane of the junction J between the two grid parts $G^1$ and $G^2$; in Figure 4, a part of the upper grid part $G^2$ is broken away so as to show in elevation a part of this depressed area 75 with the annular relatively thin walls 76 of the air-tube passages upstanding from the depressed area 75.

With this arrangement, the depressed area 75 forms in effect a relatively large-areaed liquid-fuel reservoir of a depth about equal to the depth of the radial channels 74 through which liquid fuel can be copiously supplied from the circumferentially extending supply channel 66 (Figures 3 and 2) formed on the inside face of the wall 40, and distributed throughout this reservoir are the upstanding annular walls 76 whose top edges fall in the same plane with the top face of the marginal portion of the lower grid part $G^1$ across which the channels 74 extend.

The just described structural formation of the lower grid part $G^1$ may be achieved in any desired or suitable manner, preferably however by die-casting for which the lower part $G^1$, and the structural features of the upper coacting part $G^2$ are particularly adapted in the illustrative embodiment herein described, including suitable or appropriate conformation of the inside surfaces of the air-tube passages, particularly where the latter are shaped according to the Venturi principle, as is preferred.

These and other features will be clear by reference first to Figure 6 where one of the Venturi tubes T is shown in cross section with parts of two immediately adjacent tube passages. In Figure 6 the plane of the junction J between the lower grid-like part $G^1$ and the upper grid-like part $G^2$ is so selected with respect to the total axial length of the Venturi tubes T that the throats 77 of all of the Venturi tubes, being in each case that portion of the Venturi tube passage that is of minimum diameter, fall in the plane of junction J, and thereby as to each Venturi passage, the plane of junction J represents the plane from which each tube passage increases in diameter as the respective upper entry ends and lower exit ends are approached in axial direction. Die-casting, therefore, of the two parts $G^1$ and $G^2$ individually is made possible, for the mold cores that form those parts of the Venturi tube passages T in the part $G^1$ taper or flare in diameter in a direction to permit ease of withdrawal and the mold cores that form those portions of the Venturi tube passages in the part $G^2$ taper or flare in direction also to permit ease of separation of mold from the casting.

At the same time, in die-casting the lower part $G^1$ (Figure 6), the radial channels 74, which are open in the top face of part $G^1$ as above described, and also the depressed area 75 which is also open in that top face and the upstanding annular walls 76, one for each air-tube passage, are easily formed. In Figure 6, the plane of the depressed reservoir area 75, spaced downwardly from the junction plane J, is clearly shown, as is also, in cross-section, the complete upstanding annular wall 76 of the air-tube passage T but with the plane of its top edge coinciding with the junction plane J. Figure 7, which is an elevation as seen along the line 7—7 at Figure 6, showing the parts of the latter viewed with the upper grid part $G^2$ removed, shows in elevation the three complete annular walls 76, upstanding from the depressed reservoir area 75, of the three air-tube passages indicated in Figure 6.

The upper grid part $G^2$ is of uniform thickness throughout, excepting for an extreme marginal portion later described and excepting for the air passages formed therein as above described, each passage being a complement to and matching, at the throat 77 and junction plane J (Figure 6), with an air-passage in the lower grid-like part $G^1$; because of the tapered or outwardly flaring shape of the air-passages in the part $G^2$ as better appears in Figure 6, the part $G^2$ appears in plan somewhat as seen in Figure 4 as comprising a multiplicity of ring-shaped areas but in fact the mouths or extreme upper ends of these air-passages merge into the otherwise flat or plane top face of the upper part $G^2$ as is better shown in Figure 3 as to one of them. In this manner efficiency and low resistance of air-flow downwardly as viewed in Figure 6 are improved and detrimental turbulence of air at the entry ends of the many tube passages T (see Figure 4) is easily avoided or greatly lessened.

With the respective passages in the upper and lower parts $G^2$ and $G^1$ (Figure 6) matching and coaxially aligned as they are when the two parts $G^1$ and $G^2$ are encompassed by the inside cylindrical wall face 67 (Figure 3) of the wall part 40 and when they are initially secured together by countersunk screws 80 (Figure 4) against relative rotary displacement, the underface of the top part $G^2$, at the junction plane J above described, completely closes over the depressed reservoir area 75 and also the radial feed channels 74, in effect forming a ceiling for the depressed reservoir 75, and access or flow of liquid fuel from the reservoir 75 into the air-tube passages T is barred by the upstanding annular tube portions 76 (Figures 4, 6 and 7) and by the seating of the underface of the part $G^2$ against the plane top edges or faces of these annular tube portions 76, excepting at such points, earlier mentioned above, at which I provide jet-passages to connect the liquid-fuel reservoir 75 with the air-tube passages. As above noted I preferably locate these jet passages at the throats of the Venturi tube passages and, having selected the junction plane J to be coincident with the common plane of the throats of all of the Venturi tube passages, I am enabled, in a simple, dependable and inexpensive manner to form the desired number of jet passages in one of the faces at the junction J to permit liquid-fuel entry past or over the upstanding annular tube portions 76 for discharge into the tube passages. A preferred and convenient way of carrying this out is to provide channels in the underface of the upper grid part $G^2$ that are of appropriate cross-sectional area and located so that, when the two parts $G^1$ and $G^2$ are assembled as shown in Figure 6, the channels radially overlie the upstanding annular walls 76 of the Venturi tube passages T and thus form communicating passages between the reservoir 75 and the throats of the Venturi tube passages. In the middle Venturi passage T shown in Figure 6, the outlet end of the communicating jet channel is indicated at 81 and by reference to the larger scale fragmentary view thereof shown in Figure 9 this arrangement is more clearly seen and there is also indicated a preferred cross-sectional shape for the jet channel 81, being illustratively substantially semi-circular in cross-section and of a dimension along its diameter of about 0.0075 inch where each Venturi tube T, as seen in Figure 6, has an overall length of $1\tfrac{3}{16}$ inch with maximum inlet and outlet diameters of about 0.296 inch and a throat diameter at throat 77 which is in the plane of the junction J, of 0.187 inch, all of these and other dimensions elsewhere given being, of course, illustrative and not intended in a limiting sense. The thickness of the upstanding annular tube walls 76, which project upwardly from the depressed face 75, can be on the order of 1/64 inch. The channels 81 are easily formed in the underface of the upper part G², at the desired locations, in any desired manner, preferably in the process of diecasting the part G², for in that manner a face of the die or mold is conformed at appropriate locations to shape the jet channels 8 in the cast part.

Inasmuch as it is desirable, within a given area of the composite part G, to place the tube passages T as closely together as possible, and in the illustrative spiral arrangement thereof as shown in Figure 4 and as above described they follow each other closely along the line of the spiral, the jet channels 81 in the under-face of the upper grid part G² can be aligned along the line of the spiral on which the axes of the tubes T lie, and in Figure 4 these jet channels 81 are indicated, in broken lines, substantially aligned along the spiral. In that arrangement each air-tube passage T has opening into it, at diametrically opposite points and at the throat 77 or junction J (Figure 6), two jet passages, excepting the innermost and central tube passage T which has only one jet passage 81 opening into it as shown in Figure 4. In the illustrative embodiment of Figure 4 there are 89 Venturi tubes T with 177 jet passages opening into them with the arrangement just above described. Figure 8 shows in plan view the under-face of the fragmentary portion of the part G² of Figure 6, as the same is seen along the line 8—8 in Figure 6, and Figure 8 thus shows complete those portions of the three Venturi tube passages T as are contained in the upper part G² and shows also, as seen in the just stated elevation, two jet channels 81 formed in the under-surface of the upper part G², for each air-tube passage.

Accordingly, I am enabled to comminute the liquid fuel supply at the very outset, for example, into 177 minute jets which, by their jet action, further break up the liquid; through each of the many tube passages T, unsaturated air is drawn downwardly as viewed in Figure 6, drawing liquid fuel from the distributing reservoir 75 and sub-dividing it by the 177 jet passages 81 into minute stream-like components for entry into the tube passages for atomization and vaporization thereof and co-mingling with the moving air. With the Venturi conformation of each tube T and the resultant changes in air velocity in each tube, the differential of presure below the Venturi throat 77 and hence below the junction J at which the jet passages 81 open into the tubes, is materially accentuated and rate of jet-like emission of liquid-fuel into the tube passages can be maintained at a higher level and made more responsive to the rate of air flow through each tube. The reservoir 75 (Figures 4 and 6) is well distributed throughout and about the annular tube wall portions 76 which stand surrounded by liquid-fuel the level of which is maintained under the control of the jet passages 81 and the pressure that happens to exist at their discharge ends in the throats of the Venturi tubes T, the float chamber F (Figure 3) with its float 50 and valve controlled thereby coacting, as liquid-fuel is withdrawn from the float chamber F itself, to maintain a commensurate flow of liquid-fuel into the float chamber F.

Referring to Figures 2 and 3, the upper portion of the cylindrical casing part 40 is interiorly shaped or turned to provided a step or shoulder providing a horizontal annular ledge 83 surrounded by an interiorly cylindrical wall 84, forming a seat for concentrically seating a ring-shaped frame 85 of L-shaped cross-section having a vertical cylindrical part 86 and a horizontal annular part 87. Part 86 is snugly received within the cylindrical wall face 84 as the frame 85 is let down into the intermediate casing section C². Frame part 87 is of greater width than the width of the horizontal seat 83 against which it can seat, so that an inner portion of the frame part 87 overlies a peripheral marginal portion of the top of the upper grid-like part G² which is rabbeted as at 88 so as to interfit with the inwardly projecting portion of frame part 87; thereby also, when the annular L-shaped frame 85 is stressed downwardly as is later described, it can uniformly press the upper grid part G² downwardly against the lower grid part G¹ and thereby also press the composite unit G downwardly toward the lower internal peripheral shoulder 70 and thus compress the gasket 71 to effect a good seal. It will be noted that, with the liquid-fuel distributing passages, channels and reservoirs as above described, I am enabled to achieve their intended actions and coactions with the use of only a single gasket, namely the gasket 71.

Uniformly distributed throughout the horizontal part 87 of frame 85 and located, as is better shown in Figure 2, so as to overlie the rabbeted peripheral portion of part G, are holes 90 (see also Figures 4 and 5) that provide bearings for pivot studs or pins 91 that are fixed to and project downwardly from the ends of a plurality of thin sheet metal arcuate blades 93 (see Figure 5) and which blades can be, in number and individual shape, substantially as indicated in Figure 5. In Figure 5 the outline or configuration of one of the blades 93 is clearly shown in broken lines; all of them can be of the same shape and they can be economically produced in quantity from sheet metal as by stamping. In width each is slightly less, as appears better from Figure 4, than the width of the upper face of the horizontal part 87 of the L-shaped annular frame 85 and the radius of curvature of the inside or concave edge of each blade 93 is the same as the radius of curvature of the inside edge of the annular frame part 87 (see Figure 4). Blades 93 are easily assembled to the upper face of the frame part 87 in overlying relation to the latter and in successive overlapping relation to each other, as their respective pivot studs 91 are successively entered into the uniformly spaced bearing holes 90 in the frame part 87. In Figure 4 the blades 93 are shown so assembled and all of them resting, in successive overlapping relation to each other, upon the upper face of the frame part 87 and with their inner arcuate edges substantially coinciding with the inner circular edge of the frame part 87. With the blades in the just described position, the upper entry ends of all of the Venturi tube passages T are exposed for down-draft of air through all of them thus making effective the liquid-fuel jet passages 81 for draft of liquid fuel from the reservoir area 75. From the just described position of the blades 93, each can be swung inwardly toward the center, about the axis of its pivot stud 91, and on to or over the top face which, as is better shown in Figure 3, is in the same plane with the top face of the frame part 87 and in which are the entry ends of the Venturi tube passages T, and I make provision for simultaneously controlling the pivotal or swinging movements of all of the blades 93 so as to close off the entry ends of tubes T in number depending upon the extent of movement of the blades 93 into overlapping relation to the top face of the part G².

A suitable and illustrative means for this purpose comprises a ring R of an outside diameter somewhat less than the inside diameter of the vertical L-shaped frame part 86 (see Figure 2) so as to fit into the latter for ease of rotational movement of the ring R relative to the frame part 86; the ring R has a flat underface of a width about the same as the radial dimension of the upper face of the frame part 87 and overlying the overlapping blades 93 when the latter are in the position shown in Figure 4, a position that might be called the "home" position. In the underside of ring R I provide a plurality of slots 96 which, in the illustrative embodiment, can extend along a radius of the ring R and they are uniformly spaced (see Figure 4) according to the number of blades 93 employed, there being one slot 96 for each blade 93. Upstanding from each blade 93 and appropriately displaced from its pivot stud 91 as indicated in Figure 5, is a pin or stud 97, each received within and projecting upwardly into a ring slot 96. Each blade 93 is thus connected to the rotationally movable ring R by the just described pin and slot connection 97—96 so that upon rotational movement of the ring R, in counterclockwise direction as viewed in Figure 4, turning moments are applied, through the studs 97, simultaneously to all of the blades 93 to swing them also counterclockwise about their pivot studs 91, and in Figure 5 is shown one of a wide range of incrementally changeable positions which may be simultaneously given the blades 93 to bring them over entry mouths of Venturi tube passages T; from such an illustrative position as in Figure 5, the blades 93 may be simultaneously and in increments pivoted in reverse direction in response to reverse or clockwise (in Figure 5) rotational movement of the ring R.

The ring R is controllably shifted rotationally and for this purpose I preferably provide it with a three-armed spider S of which the outer arm ends are secured or formed integrally with the upper face of ring R (Figures 2 and 5), and with their inner ends terminating in a central hub-like member 100 (Figure 2). Hub element 100 has a coaxial hole 101 which is open at its upper end and the walls of which are multiple-splined, as by broaching, to receive therein a stud shaft 102 that is multiple-splined as shown in Figure 2 throughout a greater length than the depth of the hole 101. Shaft 102 is thus non-rotationally secured to the spider in coaxial relation with the ring R, and a portion of its splined part projects upwardly beyond the end of the hub element 100 and beyond that the shaft 102 has a coaxial bearing portion 102$^a$; for the latter, I provide a bearing support as later described, and on to the upwardly projecting splined part of the shaft 102 I fit the internally splined hub portion of an operating lever 104 (Figures 2 and 1) so that, by turning the lever 104, the ring R may be correspondingly rotationally shifted.

The operating lever 104 may be in the form of a heavy sheet metal stamping with the hub part thereof appropriately drawn and internally broached for the splined inter-connection with the stud shaft 102, and with the hub part of lever 104 directed upwardly as shown in Figure 2, the upper face of the lever 104 forms a seat for the lower end of a helical spring 105 (Figure 2) which is held centered by the lever hub part and whose upper end terminates in the region of the unsplined bearing portion 102$^a$ of the shaft 102. The upper end of spring 105 I provide with a suitable abutment later described so that the force of the spring 105 yieldingly presses the ring R downwardly to maintain the pivotal connections of the pivot studs 91 of the blades 93 in their bearing holes 90 in frame part 87 and to maintain the pin-and-slot connections 97—96 with sufficient give or yieldability to provide self-accommodation of the ring R relative to the frame part 87 as the overlapping relationships of the blades 93 change throughout their range of pivotal shifting; this spring-pressed action upon the ring R also tends to bias the blades 93, when they are swung out of home positions, flatwise and downwardly one against the other and tends to cause them to maintain closeness of surface contact with each other as well as closeness of surface relation thereof with the upper face of the part G$^2$ in the plane of which the mouths of the Venturi tubes T open as above described.

The assembly may now be further proceeded with and casing section generally indicated by reference character C$^3$ (Figures 2 and 3) may now be put in place to coact with certain of the above described parts. Casing section C$^3$ comprises an annular wall member 107 that has an outer peripheral upstanding wall 108 (Figure 2) in which are formed the earlier above described large air-inlet openings 22 (see Figure 3) in the form of large rectangular cutouts and at its inner end the annular wall member 107 terminates in a heavy right-angled flange 110 of which the horizontal portion overlies the upper annular face of the intermediate casing section C$^2$ and of which the right-angled portion neatly fits within the cylindrical surface 84 by which interfitting the casing section C$^3$ is located coaxially with the casing section C$^2$; the portion of right-angled flange 110, thus received within the casing section C$^2$, engages against the upper edge face of the vertical part 86 of the annular frame 85 to hold the latter in place. Screws 112 (Figures 2 and 1) pass through suitable holes in the horizontal part of the flange 110 and are threaded into suitable threaded holes uniformly distributed in the upper end edge wall of the intermediate casing section C$^2$ to secure the two casing sections C$^3$ and C$^2$ together with a relatively yieldable gasket 113 (Figure 2) therebetween, and by this arrangement the vertical part 86 of the annular blade-carrying frame 85 is clamped in position and against rotation, between the shoulder seat 83 of casing section C$^2$ and the internal flange 110 of casing section C$^3$.

Bridged across the internal right-angled flange 110 of casing section C$^3$ is an arched yoke 115 (Figures 1 and 2), with its ends secured to or integrally formed with the internal flange 110 at diametrically opposed locations in the latter; it is arch-like in conformation so that it is out of the way of the rotationally movable spider S and so that its midpoint overlies, or falls in, the central vertical axis of the spider S and ring R, and at this point the yoke 115 has integrally formed with it a vertically extending and relatively heavy cylindrical part 116 (Figure 2) whose vertical axis coincides with the axis of the casing section C$^3$ and the above described right-angled mounting and clamping flange 110 of the latter.

The cylindrical part 116 of yoke 115 has, at its lower portion, an internal coaxial bearing surface 117 of substantial axial extent and into it is received, as the casing section C$^3$ is assembled to the casing section C$^2$ as above described, the bearing portion 102$^a$ of the stud shaft 102 by which, through the thereto-splined actuating lever 104, the spider S and its ring R may be given rotational movement, and the lower annular end face of the cylindrical part 116 takes against the upper end of spring 105 to compress it and form a fixed abutment, as earlier above described, for the upper end of spring 105. The cylindrical part 116 thus provides a bearing for fixing, coaxially with the other above described parts of the structure, the axis about which stud shaft 102 with the blade-controlling ring R is rotationally displaceable and, while the bearing part 116 is fixed in position, the stud shaft 102, at its bearing portion 102$^a$, can partake of vertical or axial movement as is necessary, under the yielding pressure of spring 105, to maintain self-accommodating assembly between the blades 93, the supporting frame part 87, and the pin-and-slot connections between the ring R and the blades 93.

Spaced inwardly from the outer apertured wall 108 (Figures 2 and 1) of the upper casing section C$^3$ is another upstanding annular wall 118, of materially lesser radius; it projects upwardly from the annular wall 107 (Figure 2) closely adjacent the junction between the casing sections C$^3$ and C$^2$ and preferably at greater radius than the radius of the circle upon which the securing screws 112 are positioned. This wall 118 is provided with large generally rectangular apertures 120 (Figure 2) and form air-outlet openings for passage of air, in suitable volume, to the substantially unobstructed space above and about the upper end of the cylindrical wall 40 of the intermediate casing section C$^2$. In the annular chamber 121 formed between the walls 118, 107 and 108 I place any suitable air-filtering medium generally indicated by the reference character M; this medium M may take the form of any suitable mass of more or less loosely arranged fibrous material, such as glass fibers, with or without adhesive coating materials thereon, appropriate to permit relatively free air-flow therethrough in the direction (radially) from the external inlet apertures 22 (Figure 3) to the internal outlet apertures 120 (Figure 2) while entrapping therein foreign particles from the moving air. It will be noted that, by the described annular construction, the chamber 121 can be made of relatively very substantial volume within a relatively small height or vertical dimension.

Casing section C³ may be assembled, as above described, to the other parts, with the filter medium M already positioned therein, for it will be noted that the securing screws 112 are easily accessible from above the casing section C³ and within the unobstructed or unoccupied space inside of the annular wall 118.

In like manner casing section C³ has assembled to it, prior to attaching it to the rest of the device, so as to form a sub-unit with the casing section C³, a suitable mechanism, generally indicated by the reference character O (Figures 1, 2 and 3) for controlling, from the exterior of the entire device, the rotational movement of spider S and its ring R. This mechanism may comprise a cylindrical housing-like part 125 which may be integrally formed with the casing part C³ or secured thereto, to extend across the upper side of the annular casing wall 107 through one of the external air-inlet apertures 22 (see Figure 3) to terminate at or adjacent an internal air-outlet aperture 120 (see Figure 2), with the axis of the housing part 125 extending parallel to a radius of the structure (see Figure 1), and as is better seen in Figures 1 and 3 the housing part 125 projects to the rear or trailing side of the device, displaced appropriately from the fuel-pipe coupling 23.

The housing-like part 125 is suitably constructed to slidably guide an operating rod 126 whose inner end (left-hand end in Figure 1) I provide with suitable connections, about to be described, for rotationally shifting the spider S and ring R in response to longitudinal shift of the operating rod 126; in this manner the setting of the blades 93 (Figures 4 and 5) relative to the venturi tubes T may be determined or varied from any point externally of the device and by any suitable means, such as manually controlled means like the "accelerator foot pedal" of an automobile, or by a speed-responsive governor mechanism such as is employed in a stationary engine installation.

In the illustrative embodiment shown, the control rod 126 is desirably spring-biased in one direction and for this purpose the housing-like part 125 has an internal cylindrical bore 127 of larger diameter than the rod 126 to accommodate therein and about the rod 126 a helical spring 128. One end of spring 128 abuts against the left-hand end wall (Figure 1) of the housing part 125 which has a suitable bearing hole through which the rod 126 slidably extends; the other end of spring 128 abuts against a collar 130 fixed to the rod 126, thus to bias the latter always to the right in Figure 1. At the right-hand or outer end of housing 125 (Figures 1 and 3), the latter is of larger bore and is internally threaded to receive a bored out or hollow nut 131 which closes off the end of the housing part 125 and forms a relatively long bearing for slidably guiding the rod 126; its inner end is arranged to abut against collar 130 so that by turning the nut 131 either inwardly or outwardly, the relative position of control rod 126 may be adjustably fixed.

At the innermost end of slide rod 126 I connect a link 133 (Figure 1) one end of which is pivotally connected, as at 134, to the outer end of the spider-actuating lever 104 and the other end of which has an articulated or universal type of connection with the end of rod 126. This latter connection, as indicated in Figure 1, may comprise a ball 136 formed on the end of link 133 and received in a spherical socket 137 formed in and opening into the end wall of rod 126, with the extreme annular end walls of the socket spun inwardly to lock the ball 136 therein. This ball-and-socket connection is free of play or loss motion in push-pull directions of motion of the rod 126 and link 133 and is self-accommodating to changes in angularity between the two parts in the horizontal plane (Figure 1) in response to swinging movement of the lever 104 and is self-accommodating to change in angularity between link 133 and rod 126 in the vertical plane (see Figure 2) in response to the action of spring 105, which, as above described, biases the lever 104 and spider S and ring R downwardly.

Preferably the splined stud shaft 102 is press-fitted into the splined hole 101 of the hub part 100 and the splined lever 104 is press-fitted onto the splined portion of the stud shaft 102. Preferably the connection between link 133 and lever 104 is arranged to be readily connectable and disconnectable and for this purpose any suitable construction may be employed, such as a manually controllable ball-and-socket connection of which the ball member 134ᵃ is carried by the lever 104 and a spring-biased socket member 133ᵃ is carried by the link 133. Accordingly, after placing the spring 105 in position about the projecting part of stud shaft 102 and interfitting its lower end with the hub part of lever 104, the sub-assembly comprising the upper casing section C³ with the housing part 125 and rod 126 and link 133 of operating mechanism O already assembled thereto, is let down onto the intermediate casing section C², the cylindrical part 116 carried by the arched yoke 115 sliding onto the bearing portion 102ᵃ of the stud shaft 102, thus also engaging the upper end of spring 105. When the screws 112 (Figures 2 and 1) are then put in position, all of these parts are held assembled. The socket joint 133ᵃ on link 133 is readily manually interconnected with the ball joint 134ᵃ on lever 104.

I next provide a top casing section C⁴ (see Figures 2 and 3) to close over the above described assembly and I preferably construct it in the form of a readily detachable cover plate which can be in the form of a sheet metal stamping; it has a disk-like top wall 140 which, adjacent its periphery, is shaped to provide an annular flute 141 in which to receive and seat the upper edge of the outside apertured wall 108 and to provide an intermediate annular flute 142 in which to receive and seat the upper edge of the inside annular aperture wall 118. The annular chamber 121 in which the filtering medium is contained is thus closed over as is also the cylindrical area within the inside apertured wall 118, and at the center of the disk-like top wall 140, I provide a central aperture 144 in a central depressed portion 145 which forms an annular shoulder overlying the upper face of the cylindrical part 116 that is carried by the arch-shaped yoke 115, with the hole 144 overlying the upper open end of the cylindrical part 116 which is threaded to receive a shouldered clamping nut 146 which is provided with an upwardly projecting handle 147 by which it may be easily manipulated with a wrench as well as manually. Nut 146 strains and clamps the central portion of the casing part C⁴ downwardly against the end of cylindrical part 116, thus maintaining also good seating of the annular walls 108 and 118 in their respective annular recesses formed by the flutes 141 and 142.

Peripherally the top cover casing section C⁴ preferably has an over-hang beyond the outer annular wall 108 to give, when desired, weather protection to the peripherally distributed air-inlet apertures 22 and for use with an automobile engine, this over-hang, throughout the rear or trailing half of the periphery, can be in the form of a small downwardly and outwardly directed flange 151 (Figures 2 and 3) and throughout the front or leading 180° extent of the periphery it preferably comprises a skirt-like flange 152 which overlies the apertured wall 108 but spaced radially outwardly therefrom so as to form a vertical baffle in front of the underlying air-inlet openings, while permitting easy access of air to the latter for movement through the filtering medium M by way of the substantial spacing of the lower edge of the baffle 152 from the apertured wall 108.

As above noted the thumb nut 146—147 is easily removable so that this top casing part C⁴ can be readily lifted off particularly for the purpose of replacing the air filtering medium M in the annular chamber 121 as it needs to be replenished and also, when necessary, to gain access to any of the moving parts and controls above described.

As above explained, the blades 93 (Figure 5) form a diaphragm in which the opening P for the passage of air (downwardly, in Figure 3) is variable in size and in the illustrative embodiment this opening is always substantially circular for any set position of the blades 93, being also always coaxial with the other parts of the device and coaxial with the axis of the spiral along which the Venturi tubes T are arranged so that, as later described, changes in the number of Venturi tubes made effective as well as changes in their effectiveness can be made to take place non-linearly and thus better related to the peculiar and varying demands of the internal combustion engine. Desirably, as in an automotive installation, provision is made for preventing the opening P from becoming smaller than a selectable minimum size which may, illustratively, be comparable to that which is appropriate for maintaining an idling speed of the engine; in the illustration, the spring 128 (Figure 1) normally biases the control rod 126 to the right and, when unrestrained, moves the spider S and blade-control ring R counter-clockwise (in Figures 1 and 4) to swing the blades 93 inwardly toward the center, and by adjusting the nut 131 (Figure 1) by turning it in one direction or the other, its inner end is correspondingly positioned at the desired location at which it is desired to limit the movement of the control rod 126 to the right, the collar 130 on the rod 126 limiting rightward movement of the latter by engagement with the adjustable stop nut 131. With an illustrative diameter for the Venturi tube containing grid structure G as earlier given above, the blades 93 may provide a minimum opening P as small as 0.75 inch in diameter, by setting the nut 131 at its maximum outermost position. In the illustrative median setting shown in Figure 5, there are about 27 Venturi tubes T that are made effective, with about 13 or 14 progressively more and more cut off by the overlapping blades 93, being so cut off because of the spiral arrangement of the tubes T in relation to the circular opening P. Each of the 30 or so completely effective Venturi tubes T can function at good efficiency in response to the down-draft therethrough of filtered air from the internal air discharge openings 120 (Figure 2), as caused by the suction or negative pressure in the intake manifold 20 as called for by the intake strokes of the engine; at the corresponding air velocity through these Venturi tubes, the accompanying increases in negative pressure therein cause the liquid fuel from the reservoir 75 to be issued or sprayed, through the jet passages 81, into the paths of the air moving through the Venturi tubes, causing a further breaking up of the liquid-fuel into small particles and effecting a comingling therewith of the air, accompanied also by vaporization of liquid-fuel.

The fuel-air mixture, containing many minute particles of liquid-fuel, emerges from the lower discharge ends of the uncovered Venturi tubes T, downwardly from the under-face of the grid-like assembly G as viewed in Figures 2 and 3, and this downstream is coaxial with the central vertical axis of the entire structure just as is the intake of filtered air at the upper or mouth ends of the tube passages T inasmuch as the blades 93 (Figure 5), in whatever position they are given, maintain the circular opening P coaxial with the substantial space within the coaxial internal annular wall 118 (Figure 2) through the apertures 120 of which the filtered air emerges from the annularly disposed filtering medium M.

In the above assumed illustration, with 30 Venturi tubes fully effective, there are in effect 30 individual streams of fuel-air mixture that emerge from the underside of the assemblage G (Figures 1 and 2) but as a whole or as a group they are coaxial as above described and upon emergence, and due to the intake manifold suction and other factors about to be described, their discharges become comingled in the space below the structure G from which they are, in the illustrative embodiment, drawn and guided radially outward, above the baffle 44, for movement toward the outermost part of the upper annular chamber 37ᵃ above described. As shown in the drawings, the baffle 44 has uniformly distributed, closely adjacent the peripheral portion that is received in the rabbets 42—43 (Figure 2), closely spaced ports 150 of large flow capacity for passage therethrough of the fuel-air mixture into the lower annular chamber 37ᵇ whence it can move radially inwardly for ultimate entry into the central efflux passage formed in the casing section C¹ where the latter is attached to the intake manifold 20. These annular conformations of the upper and lower chambers 37ᵃ and 37ᵇ are advantageous in that they provide, in the aggregate, large volume and long paths of flow within small vertical dimension for the advantageous distribution therein, along the radial lines of flow in each, of vaporizer filaments, preferably metallic and which I preferably make up in the form of a truncated or flattened toroid, one for each of the chambers 37ᵃ and 37ᵇ, as indicated at 151 and 152 (Figure 2). The toroids 151, 152 may be constructed, as is about to be described, in the form of packet-like entities, sectionalized along radii if desired, while at the same time orienting the metal filaments in the direction of intended flow of the fuel-air mixture which direction, in the illustrative embodiment, is radial. As such entities, the packets are assembled or put in position, in the course of the earlier stages of assembly of the entire device, preferably in coaction with certain features of construction of the baffle plate 44 itself.

The packets 151, 152 which are pervious because of the relatively loose association of the metal filaments thereof, may be made preferably of filaments of metallic ribbon, such as copper ribbon, illustratively about 3 mils thick and 15–25 mils wide, and the metal ribbon is preferably deformed or conformed, in any suitable manner, to provide it with portions that extend out of its otherwise straight-line axis in order that adjacent or parallel lengths of the ribbon do not contact each other flatwise but rather are, by themselves, held spaced from each other in order to provide connected or comingled air passages that extend generally along and about the oriented filaments. A convenient conformation of the ribbon filaments may be like that shown in Figures 10 and 11 where a short length of ribbon filament F¹ is shown in sinuous or undulating conformation as seen in plan or flatwise in Figure 10, with spaced undulations in transverse direction as the ribbon is seen edgewise as in Figure 11. With long lengths of such ribbon filament the packets 151, 152, either in the entire toroid of each or in sections, may be built up by laying the ribbon filament F¹, starting at the mid-plane of a packet as viewed in Figure 2, back and forth along a radius and between the limits of the inner and outer radii which, as shown in Figure 2, fall respectively about where the upper annular wall 41 joins the cylindrical casing wall 40 below the shoulder 70 and about at the inner edges of the ports 150 in the baffle 44. The lay of the filaments when so laid or "wound" is always in the direction of fuel-air mixture flow, radial in the illustrative embodiment, and the undulations in the filaments, indicated in Figures 10 and 11, coact as spacing elements between adjacent or contiguous radial extents of the ribbon filaments and thus aid in maintaining good exposure of the surfaces of the filaments and in maintaining longitudinally and laterally interconnecting radially extending passages between and amongst the ribbon filaments, and also aid in maintaining the cross-section of the packet (see Figure 2) so that it conforms substantially to the cross-section of the chamber in which it is placed and thereby constrains fuel-air mixture to flow along the radial air passages and sweep lengthwise along the surfaces of the oriented filaments.

The filaments employed in making up the evaporator packets as above described may be given other conformations while maintaining their lay or orientation in the direction of fuel-air mixture flow, and in Figures 12 and 13 I have shown at $F^2$ an advantageously conformed filament for the packets; in this form, the filament, preferably of metal ribbon of cross-sectional dimensions as indicated above, is conformed to give it a permanent or set twist, about its central longitudinal axis, of preferably uniform pitch, a pitch on the order of that indicated in Figure 12. In such conformation, each longitudinal side edge of the ribbon filament $F^2$ lies along, or conforms to, a helix of small diameter (see Figure 13) a diameter on the order of the width of the ribbon. When building up the packets 151, 152 by laying or winding this helically conformed ribbon $F^2$, the same procedures may be employed as described above in connection with the filament $F^1$ of Figures 10 and 11, the lay of the filaments $F^2$ being always in the direction of fuel-air mixture flow, radial in the illustrative embodiment, and the substantially helical undulations or conformations which the side edges of the filaments $F^2$ (Figures 12 and 13) provide, coact as spacing elements between adjacent or contiguous radial extents of the ribbon filaments and this twisted conformation thus aids in preventing undesired face-to-face or flatwise contact between adjacent substantially parallel filaments of the packets, thereby maintaining good exposure of the surfaces of the filaments and also maintaining longitudinally and laterally interconnected radially extending passages between and amongst the filaments. This twisted conformation of filament $F^2$ is thus made to serve as its own spacing element relative to adjacent filaments of the packets, maintaining the cross-section of the packet so that it always conforms substantially to the cross-section of the chamber in which it is placed and fuel-air mixture is thus constrained to flow along and sweep lengthwise along the surfaces of the oriented filaments $F^2$. The twists in the latter produce an advantageous swirling turbulence while maintaining flow lengthwise of the filaments of the stream of fuel and air, and aid in comingling of the mixture as it proceeds lengthwise of the many filaments. By changing the pitch of the twist, or varying the pitch from entry end to exit end of the packet, this desirable swirling type of turbulence can be suited to various requirements.

By such conformations of ribbon filaments, such as filaments $F^1$ and $F^2$ above described, the packets are individually built up, with the filaments laid lengthwise of each other in the direction of fuel-air mixture flow, conveniently and preferably by starting with an initial lay along the median plane of the packet (indicated, in Figure 2, by the heavier line along the horizontal middle portion of the cross-section of each of packets 151 and 152), and then continuing, as by winding the metal filaments about this initial lay, treating the latter and successive lays or reaches of filaments as a core upon which to continue to wind or lay the filaments. Any number of filaments of substantial length may be used in so constructing any one packet and in this manner the desired cross-sectional dimension of the packet is built up. The filaments, aided by their conformations, sufficiently interengage mechanically to form a self-sustaining packet-like unit, which can be easily handled without risk of detrimental deformation. Accordingly, at appropriate points in the above described sequence of the assembly of the structure, packet 152 (Figure 2) is laid in position on the wall 34 and packet 151 is laid in position on the baffle 44.

Suitably distributed, preferably along the line of a circle of a radius intermediate of the radii of the toroidal packets 151, 152 (see Figure 2), disk-like baffle plate 44 has projecting from its faces conoidal lugs 153 and 154 which enter into the packets and thus anchor them against displacement; thus packet 151 is held coaxial with the central vertical axis of the downward flow of fuel-air mixture emerging from the effective Venturi tubes T in the grid structure G and packet 152 is held coaxial with the axis of the exit passage in the bottom casing part $C^1$ that leads to the intake manifold 20.

The upper face of baffle plate 44 is provided with a coaxial sling ring 156 (Figure 2) of a radius just about equal to the lesser radius of the upper vaporizer packet 151, thus locating ring 156 at the annular entry end of packet 151. Sling ring 156 encompasses a large coaxial circular surface 157 below the exit ends of Venturi tubes T and below the casing shoulder 70, being preferably of materially greater radius than the radius of the flow-curved under-face of the shoulder 70. The circular surface 157, aided by the curvature of the sling ring 156, coacts with the curved under-face of shoulder 70 is guiding the downwardly emerging discharge from the Venturi tubes drawn by the action of the negative pressure in the intake manifold substantially uniformly in radially outward directions for entry through the inner annular entry end of the upper vaporizer packet 151, thus uniformly distributing the discharge for radial outward sweeping flow along the above described passages formed between the radially oriented filaments of the packet 151. Emerging from the outer annular exit end of packet 151, substantially uniformly distributed throughout the peripheral face thereof, the flow is then guided downwardly throughout the peripherally distributed ports 150 for uniformly distributed entry in the outer annular entry end of the lower vaporizer packet 152, whence it continues in radially inward directions, along the above described passages formed between the radially oriented filaments and sweeping along the surfaces of the latter, to emerge at the inner annular exit end or face of packet 151 for subsequent entry into the intake manifold 20. These movements along the oriented ribbon filaments are accompanied by coactions and actions about to be described.

Referring to the illustrative setting of opening P (Figure 5) to make 30 Venturi tubes T effective, it will first be noted that, with the jet passages 81 arranged as above described, there are then effective 59 jet passages so that, for the fuel demand corresponding to that setting of opening P, the liquid-fuel is initially sub-divided into 59 emerging sprays or jets in each of which, because of the small cross-section of the jet passages 81 and because of the pressure differentials acting upon the liquid-fuel in the reservoir 75, the emerging liquid-fuel is broken up by the spray action, so that the total quantity of air moving downwardly through the 30 Venturi tubes T, divided equally amongst the latter, thus finds the liquid-fuel already very materially atomized or broken up into liquid particles; the latter are also impacted by the downwardly moving air streams in the 30 Venturi tubes, thus still further comminuting the liquid particles and improving the atomization of the total fuel supply to the thirty tube passages by the 59 jets. Because of the many Venturi tubes and their closely compacted distribution relative to the opening P, this improved atomization is of a high order, the total atomization being the sum of the many increments of composite atomizations represented by the 30 Venturi tubes T and their coacting 59 jet passages 81 and represented at maximum value of opening P by the 89 Venturi tubes of the spiral and 177 jets in which case the maximum fuel demand is initially sub-divided into 177 atomizing sprays; for such reasons the total volume of fuel-air mixture that emerges from the discharge ends of the spirally grouped Venturi tubes is one of substantial uniformity of admixture of air, atomized liquid-fuel, and some liquid-fuel vapor, for each of the many Venturi tubes and their respective fuel jets functions at the same efficiency as the others, all operating under similar conditions and each performing but a small increment of the total function of achieving the overall or sum total of atomization. At less than maximum value of opening P, a series of Venturi tubes stands progressively throttled and the rest are closed off, both together forming a preconditioned stand-by to provide, as later described, for quick responsiveness and rapid rate of increase of fuel vapor and air mixture supply to the engine as, for example, in case of need for rapid increase in speed or power, or either.

This admixture that emerges from the Venturi tubes (the 30 tubes above-mentioned, for the assumed setting of opening P) is then guided and moved, in the paths and directions above described, radially outward through the upper vaporizer packet 151 and then radially inward through the lower vaporizer packet 152; it is drawn through the passages formed between and alongside the ribbon filaments all of which extend in the direction of flow as above described, and fuel droplets or particles thereof cannot avoid being deposited on the long narrow oriented surfaces of the filaments along which they are filmed out and attenuated lengthwise of the filament surfaces because of the action thereon of the continuing moving mixture which sweeps along in the direction of the lengths of the filaments and thus the vaporization thereof is enhanced.

In this action of filming out and of enhancing evaporation, the undulations in the filaments $F^1$ of the packets, illustratively as described above in connection with Figures 10 and 11, coact in that they not only help, as above described, in maintaining air passages between the many filaments but also cause a deflecting action which produces a desirable degree of local turbulence while maintaining flow lengthwise of the filaments of the stream of fuel and air and these actions improve the rate of evaporation of the fuel films formed along the filaments as the fuel wets them. The filaments of the pervious packets 151 and 152 may be of any material that is impervious to the fuel and wettable by it, preferably a material of low specific heat, as to all of which copper ribbon, as above described is a good example. With copper ribbon dimensioned as earlier noted, the packets 151, 152 can be made up to have, in a cross-section transverse to the cross section of the packets as shown in Figure 2, some 500 passages per square inch. What emerges from the inner annular exit end of the lower packet 152, for flow into the manifold 20 to the engine cylinders, is a homogeneous mixture of fuel vapor and air, and because of other coactions this result is substantially uniformly achieved throughout changes in the rate of supply as the relationship between the overlapping diaphragm blades 93 and the many Venturi tubes T is changed.

Let it be assumed that the control rod 126 (Figures 1 and 3) is shifted by the accelerator pedal to increase the number of Venturi tubes T beyond the 30 described in the above assumed illustration in which 30 tubes T are fully effective and about 13 or so, because of the geometric relation between the arrangement of the tubes T and the shape of the opening P, stand progressively less and less exposed to the downflow therethrough of air emitted from the filter chamber. Some air is drawn down through these latter Venturi tubes in progressively less and less quantities according to the correspondingly smaller effective entry passages so that it can be said that these 13 Venturi tubes T stand "throttled" in progressively increasing extent; their respective carbureting effects, that is, their respective actions in drawing liquid-fuel from their jet passages 81 for admixture with air flow therein, are likewise progressively less. Their discharges, at the lower ends, become part of and comingled with the above described discharge from the 30 fully effective Venturi tubes, as will now be clear. In each of them, though in progressively varying degree, carbureting action is taking place so that, as the blades 93 increase the size of opening P, these 13 Venturi tubes promptly respond to the increasing volumes of air flowing downwardly therethrough as the movement of the blades 93 progressively increases to maximum the effective air-intake to each. This means, in effect, that, when more power or speed is required of the engine, there is no time-delay or sluggishness of response because, with 30 fully effective Venturi tubes and with about 13 progressively "throttled," the latter, already in action, instantaneously respond to full throttle for each, giving an instantaneous increase in capacity in the ratio of 13 to 30. It will be noted from Figure 5 that it requires only a small rotational displacement of the blade-control ring R to increase the air inlet to any partially throttled Venturi tube. At the same time also many more Venturi tubes T are coactingly brought into action.

Again viewing Figure 5, the 13 above mentioned Venturi tubes that stand progressively throttled while 30 are in full action, the progressively throttled Venturi tubes fall along about half of a spire of the spiral. The conjoint movement of the overlapping blades 93 that is appropriate to completely open the flow passages of this series of 13 tubes does so incrementally and also operates to bring, also incrementally, into progressively throttled condition another series of successive Venturi tubes that lie further along the spiral so that respective air flows can take place therein to pre-condition them; they thus stand ready for instantaneous full responses when called upon or permitted by subsequent increase in the size of the diaphragm opening P as the blades 93 are again or further shifted.

Thus, for any size of diaphragm opening P less than the maximum that is provided when the blades are in the earlier described home position of Figure 4, air flow and fuel flow are correlated in respectively minute entities, in the honey-comb of Venturi tubes T with their respective fuel jets 81, all operating at high capacity and high efficiency with a stand-by series of progressively throttled Venturi tubes, also substantial in number, which operate upon progressively smaller entities of air so as to stand conditioned for immediate high capacity and high efficiency of action if and when the blades 93 allow full air flow thereto upon subsequent movement to increase opening P. More and more of the Venturi tubes on the spiral can thus be progressively conditioned for, or brought into, full capacity of action; the action is incremental, being peculiarly in an infinite number of steps, and is free from abrupt or other detrimental variables.

For any increase in diaphragm opening P and regardless of the rate of such increase, the discharge emerging from the underside of the assemblage G (Figures 3 and 2), being the sum total of the discharges of the fully effective Venturi tubes and of the series of progressively throttle Venturi tubes, is then subjected to the vaporizing actions, described above, in the vaporizer packets 151 and 152, supplying the manifold 20 with a homogeneous charge of fuel vapor and air. In this connection, the sling ring 156 acts as a barrier to any direct radially outward flow of liquid fuel that might tend to collect in the pan-like circular baffle portion 157 as a result of the inclusion in the Venturi tube discharges of liquid-fuel droplets of substantial size and as might not be sufficiently broken up. The fuel-air mixture of this total discharge, being guided or deflected and drawn radially outwardly into the upper vaporizer packet 151, sweeps radially outwardly, from the center, of the central baffle portion 157 and in so doing moves any liquid fuel in the portion 157 radially outwardly and, with the aid of the sling ring 156, in effect slings the liquid in generally upward direction, further breaking it up, into the path of fuel-air mixture entering the inner annular entry end of the packet 151. Such liquid is thus further broken up and, being prevented by these actions and by the swing ring 156 from flowing along the bottom wall on which the packet 151 rests, is forced to become filmed out along the flow-oriented filaments of the packet for evaporation in the manner earlier above described. Whatever the reason that a pool of liquid fuel might form in the central baffle portion 157, the just described actions make certain that liquid fuel cannot pass on to the intake manifold 20 and for any such condition or any setting of the diaphragm opening P, whatever fuel droplets or particles that are not evaporated in the upper packet 151 pass, with the mixture, through the ports 150 for entry into the lower packet 152 in which, by the earlier described actions, attenuation of fuel particles on the flow-oriented filaments insures that evaporation is complete and that fuel vapor and air, in homogeneous admixture, emerge from the inner annular outlet end of the packet 152 for supply to the engine intake manifold 20.

One of the advantages in having a series of partially throttled Venturi tubes functioning to their respective extents along with a substantial number of Venturi tubes functioning at full effectiveness is that, when these partially throttled tubes are brought into full effectiveness upon increase in the opening P, the detrimental effects of inertia are avoided or materially reduced and time-lag in responsiveness avoided or greatly lessened; in each of the series of partially throttled Venturi tubes, there is movement, downwardly therethrough, of air accompanied by such atomization of liquid-fuel as takes place in the respective Venturi tubes so that, when they are completely opened, it is a case primarily of increasing the volume of air flow in each tube rather than having to overcome the inertia of a stationary column or volume of air in the Venturi tube. The pre-conditioning, in this manner, of an entire series of Venturi tubes and thus readying them to respond quickly when engine speed or power or both have to be increased, coacts in achieving quick increase in engine speed or power as the diaphragm opening P is increased. At the same time, as earlier described, additional and therefore inactive or completely throttled Venturi tubes T, in the continuation of the spiral arrangement, are set for pre-conditioning in that the overlapping blades 93 adjust their entry mouths at progressively different stages of throttling and thus they are made ready for substantially inertia-less response, progressively, to the next increment or stage of increase of diaphragm opening P. These actions are progressive as to the succession of whatever is the number of progressively throttled Venturi tubes in the pre-conditioned series, such as the 13 above-mentioned in relation to the 30 Venturi tubes in the illustrative setting of Figure 5, and upon decreases in the size of diaphragm opening P these actions are also progressive and always leave a series of so pre-conditioned Venturi tubes.

Changes in rate or volume of supply to the engine of mixture of fuel-vapor and air are, moreover, effected smoothly, due to such coactions as above described, aided by the effective action of the vaporizer packets 151, 152 in damping or smoothing out pressure pulsations which the actions of the engine cylinders and pistons tend to create. Furthermore, for each change in the size of the diaphragm opening P, the action upon the Venturi tubes T is to affect many of them in small progressively increasing increments so that steep or abrupt changes and their detrimental effects can be avoided, and thus also mutual responsiveness between the engine and the carbureting processing of the liquid fuel materially improved.

In the embodiment of my invention above described, I prefer, as noted, to arrange the Venturi tubes T of the honeycomb or grid-like structure G in a spiral and to make the variable diaphragm opening P circular with its center or axis coincident or aligned with the center or axis of the tube spiral, in order to gain still further advantages. The control rod 126 (Figure 1) has the advantage of straight-line motion for ease and simplicity of control but, in changing the diameter of diaphragm opening P in response to a given shift of the control rod 126, the change in area of the opening P is non-linear, being a function of the square of the diameter. This is of particular advantage when prompt increase in engine speed or power or both has to be effected, for in that manner the rate at which additional incremental Venturi tubes are brought into action in the spiral arrangement thereof underneath the diaphragm opening, can also be made non-linear and can be made to vary as the square of the increment of straight-line shift of the control rod 126. It may be said that the power or energy required to propel a vehicle such as an automobile varies directly substantially as the square of the speed of the vehicle and, with my just-mentioned arrangement and as the speed of travel of the car is increased, I am enabled to provide, in such case, for substantially similar rate of variation in the number of effective Venturi tubes, by appropriately relating the total number of Venturi tubes T and the pitch of their spiral to linear change in the diameter of opening P so that, under the control of the diaphragm formed by the blades 93, the rate of exposure, at opening P, of Venturi tubes varies substantially as the square of the diameter of opening P. In like manner, by appropriately changing the number of spires in the spiral, and the pitch of the spires, and the pitching, that is, center to center spacing, of the tubes T on the spires, in relation to each other and to the change in diameter of the variable diaphragm opening P, I am enabled to suit my system and apparatus for carburetion to any inherent or required characteristic of internal combustion engine operation or condition. Wide flexibility of arrangement is thus made possible; for example, the center to center spacing of the tubes T need not be uniform but may vary, or may in part be uniform and in part of different spacing or in part of non-uniform spacing; or the pitch of one spire may be in whole or in part greater than the pitch of its adjacent inner spire; or the pitch of the tubes T on one spire may be different from the pitch of the tubes on another spire; and so on. All of these advantages are achieved while retaining the advantages of simplicity of construction and dependability of action of the iris-diaphragm which the blades 93 form.

In this latter connection it may be noted that, aside from the movable mounting features of the blades 93 as above described, the blades 93, always overlapping and each being of substantial arcuate extent, provide mutual support for each other at whatever their setting, from minimum diaphragm opening P to maximum, and they are thus well adapted to function dependably under the varying conditions of high velocity of air flow through the diaphragm opening. Moreover, their control or shift, as by the ring R as above described, is positive and reliable, and is accompanied by substantial mechanical advantage in that, while each blade 93 (see Figure 5) is pivoted at one end by pivot pin 91 to the stationary ring-frame 85 (see Figure 2), shift of the blade 93 is accomplished by the rotational movement of ring R which is transmitted to the blade by way of pin 97 at the other end of the blade (see Figure 5) which engages in the slot 96 of the ring R; it will thus be seen that ease of rotary shift of ring R is accomplished because the ring in turn operates upon each of the overlapping blades 93 throughout an extremely long lever arm, being in effect of a length equal to the straight line distance between the pivot pin 91 and the shift pin 97 at the respective extreme ends of the long arcuate blades. Such ease of actuation of ring R and of the blades 93 is also facilitated by the action of spring 105 (Figure 2) which stresses the spider S and ring R downwardly and yet provides, as above noted, ease of self-accommodation of ring R and of the underlying overlapping portions of the blades 93; as shown in Figure 2 the internal annular shoulder or flange 110 of the upper casing section C³, while clamping the ring frame 85 in position and against rotational movement, overhangs the ring R and forms a stop to limit upward movement of the ring against the action of spring 105 by an amount sufficient to prevent unintentional disassembly or disengagement between the pivot pins 91 and operating pins 97 of the blades 93 and the frame flange 87 and ring R with which they respectively coact.

Moreover, the frame ring 85 (Figure 2) serves as a carrier on which blades 93 and ring R with its spider S are first assembled, with the blades 93 in home position on the frame part 87, and these parts form a sub-assembly which is simply let down into the intermediate casing section $C^2$, onto the shoulder 83 for subsequent clamping of frame part 86 by the flange 110 of casing $C^3$ as assembly proceeds as above described.

It will thus be seen that there has been provided in this invention a method and means for producing a combustible air and fuel-vapor mixture in which the various objects above set forth or indicated, together with many thoroughly p r a c t i c a l advantages, are successfully achieved. The multitude of Venturi-tube and fuel-jet units, each of relatively small capacity, minutely subdivide the carbureting burden and are controlled and operated in a manner to facilitate functioning of each at high or optimum efficiency, and to function in selective varying number to suit or substantially match the varying demand characteristic; they are brought into action as individual increments or decrements at varying rates or in varying numbers according as demand increases or decreases, all while preconditioning inactive units in respectively differing stages to prepare them for substantially inertia-less and prompt response, particularly to steep or sudden increases in demand. A preferred and illustrative progressive pre-conditioning I have described above and I have indicated how a series of preconditioned units may function; these actions are greatly facilitated by the coaction with the grid-like arrangement of Venturi-tubes and fuel inlet jet passages, of the baffle plate 44 with its central part 157 and sling ring 156 (Figures 2 and 3) and the flow-oriented filaments of packets 151, 152. For example, of the pre-conditioned tube-and-jet units, several may be functioning to atomize their respective minute quantities of liquid fuel at close to good efficiency, in some air-flow may be insufficient adequately to break up liquid fuel slowly drawn out of the jet passages 81 thereof so that relatively large droplets of liquid fuel might emerge or be discharged from these tube outlets, while the rest which are progressively more and more throttled by the overlying blades 93 of the diaphragm may contribute less and less to the discharge yet might tend to cause a slight or slow rate of emergence of liquid fuel out of their jet inlet passages 81.

Any such actions of pre-conditioned Venturi-units as pass on liquid fuel are reliably prevented from detrimentally affecting the homogeneity of the fuel-vapor and air mixture flowing to the manifold 20 by the baffle portion 157 and sling ring 156 and moving air force it to film out along the flow-oriented filaments, insuring that such liquid fuel is effectively converted to vapor. For such reasons and coactions as these, pre-conditioning and its many advantages can be reliably assured.

At any diaphragm opening less than full-open position of blades 93, the latter are in close association with or juxtaposition to the entry mouths of the Venturi tubes T so that the above-described throttling or flow-control actions are achieved. The respective ends of the blades 93 always lie upon or above the horizontal ring-frame part 87 but because of the way they are overlapped and interleaved their composite under surface is somewhat arched, it being understood that the upper surface of $G^2$ can be made slightly convex to conform to the arch of blades 93 throughout their entire range of displacement, if so desired.

As above described, I may construct my device to have two efflux passages 31 and 32 (Figure 2), as by the vertical divider 33 along the minor axis of the lower casing part 26. Divider plate 33 extends upwardly so that its top edge falls in the plane of the annular seat or rabbet 42 in the peripheral flange 35 and is thus snugly engaged by the underface of baffle 44. In order better to divide the supply of air-vapor mixture to the two efflux passages 31 and 32, I also preferably divide the lower chamber $37^b$, which contains vaporizer packet 152, into two parts, each of 180° extent. Thus, I may provide divider plate 33 with identical opposed fin-like extensions, of which one is better shown in cross-section in Figure 3 at 158, that fall along a diameter of chamber $37^b$, with their top edges falling in the plane of the under face of baffle 44. In such case the lower vaporizer packet 152 is sectionalized along two radii which fall on a diameter, the resulting two packets forming a complete annulus excepting where they are separated from each other by the thin separator fins 158, 158. Divider 33 can be formed as an internal cross-web of suitable configuration to extend along the minor axis of the casing part 26 (Figures 2 and 3) with its opposed extensions 158 formed as thin walls or fins upstanding from the casing wall 34 as better appears from Figure 3; by casting, these parts may be readily formed in one piece.

It will also be seen that the illustrative device herein disclosed is well adapted for efficient manufacture and assembly and for facility of installation, operation, use and maintenance.

This application is a continuation-in-part of my application Serial No. 60,001, now Pat. No. 2,661,269, issued Dec. 1, 1953.

As many possible embodiments may be made of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. In apparatus of the class described, in combination, a bottom casing section having an efflux orifice and having connected thereto an intermediate casing section having an internally stepped cylindrical part of substantial diameter, a grid-like structure comprising two superimposed disc-like parts received in said cylindrical casing part and seated on an annular step thereof and thereby positioned coaxially with said cylindrical part, said structure having distributed throughout a central area thereof many vertical Venturi-tube passages therethrough with their axes parallel and with the narrow parts of their throats lying substantially in the plane of the junction of said two disc-like parts, at least one contiguous face of the latter being depressed about said tube passages to form a distributed liquid-fuel reservoir, said structure having jet passages leading from said reservoir to said Venturi-tube passages at substantially the throats of the latter, said intermediate casing section carrying externally thereof a fuel float-chamber having communication through the wall of said cylindrical part with said reservoir, a ring-frame received in said cylindrical casing part and seated against the uppermost of said disc-like parts, said ring-frame carrying a plurality of movable overlapped blades forming a transverse diaphragm that overlies said Venturi-tubes and provides a variable opening that is coaxial with said cylindrical part and said grid structure, said ring-frame having associated therewith a spider terminating in a blade-control ring coaxial with said ring-frame, said control ring having mechanical connections to shift said blades in response to rotary movement of the control ring to vary the diaphragm opening, said spider having at its central vertical axis one element of a two-part bearing structure, an upper casing section having a ring flange that coacts with said cylindrical casing part to coaxially aline them and engages said ring-frame and has extending radially therefrom an annular wall supporting wall means forming therewith an annular chamber having an outer apertured cylindrical wall for air influx and an inner apertured cylindrical wall for air efflux to the region above said Venturi-tubes and diaphragm, an air-filtering medium between said apertured cylindrical walls, said ring flange having a yoke bridged thereacross in the space within said inner apertured wall and extending above said diaphragm and over said spider, said yoke having at its center the companion element of said two-part bearing structure, means for securing said upper casing section to said intermediate casing section to clamp said ring-frame and also to fix the position of said yoke and thereby the axis of said companion bearing element, and means operable from the exterior for rotatively shifting said control ring to vary the area of the diaphragm opening and the number of Venturi-tubes that fall wholly and partially within the projected area of the variable opening.

2. An apparatus as claimed in claim 1 in which the distribution of said Venturi-tubes in said grid-like structure is substantially along a spiral and the variable opening formed by said overlapping blades is circular, the center of the spiral and the center of the variable diaphragm opening falling substantially on a common vertical axis whereby rate of change of effective Venturi-tubes is a function of the relation of the spiral to the rate of change of diameter of the diaphragm opening.

3. An apparatus as claimed in claim 1 in which said ring-shifting means comprises a two-part mechanism of which one part is operatively carried by said upper casing section and extends to the exterior of the latter and of which the other comprises a control-ring driver with means forming a connectible driving connection between the latter and said upper-casing-carried part whereby, upon assembly of said upper casing section to said intermediate casing section, said driving connection may be completed.

4. An apparatus as claimed in claim 1 in which said communication between said reservoir and said float-chamber comprises a circumferential channel in one of the contiguous cylindrical faces of said disc-like grid structure and said cylindrical casing part, said grid structure having distributed passages leading substantially radially from said reservoir to said circumferential channel and said cylindrical casing part having passage means through its wall leading from said circumferential channel to said float chamber.

5. An apparatus as claimed in claim 4 in which there is interposed between said internal annular step of said cylindrical casing part and said grid-like structure a ring-gasket which is held in sealing relation by the coaction of said ring-flange with said ring-frame.

6. An apparatus as claimed in claim 1 in which said ring-frame is substantially L-shaped in cross-section, it being the horizontal portion thereof that carries said movable blades, the vertical portion of said ring-frame peripherally encompassing said blades and the control ring and extending above the latter, it being said vertical portion that is engaged by said ring flange.

7. An apparatus as claimed in claim 6 in which said ring-flange of the upper casing section overlies at least a portion of said control ring to hold it against upward disassembly movement.

8. An apparatus as claimed in claim 1 in which said wall means comprises a top disc-like closure plate that overlies said apertured cylindrical walls and also the space within the inner apertured cylindrical wall, with means securing said closure plate in closing position.

9. An apparatus as claimed in claim 8 in which said closure-plate securing means comprises a securing element at the axis of said cover plate having detachable connection with said yoke.

10. An apparatus as claimed in claim 8 in which said yoke-carried bearing element comprises a sleeve member and said spider bearing element comprises a stud shaft received into said sleeve, said closure-plate securing means comprising means at the center of the disc-like closure plate having threaded connection with said sleeve member.

11. An apparatus as claimed in claim 1 in which said yoke-carried bearing element comprises a sleeve member and said spider bearing element comprises a stud shaft entered into said sleeve, said last-mentioned means comprising a lever arm carried coaxially with said stud shaft and a mechanism carried by said upper casing section having an operator extending into the space within said inner cylindrical wall thereof, with means forming a substantially articulated and easily connectible driving connection between said lever arm and said operator.

12. In apparatus of the class described, in combination, a casing section having an internally stepped cylindrical part of substantial diameter, a disc-like structure received in said cylindrical casing part and seated on an annular step thereof to extend transversely of said casing part and having a plurality of vertical Venturi-tube passages therethrough with their axes parallel to each other, said disc-like structure having an internal transverse liquid-fuel receiving cavity traversed by said tubes and connected with the latter by jet passages through the walls thereof substantially at their throats, means for feeding liquid-fuel from the exterior of the casing to said cavity, a ring-frame received in said cylindrical casing part and seated adjacent the periphery of said disc-like structure, said ring-frame carrying a plurality of movable coacting blades forming a transverse diaphragm that overlies said plurality of Venturi-tubes and provides a variable opening for influx of air to tubes wholly and partially uncovered by the blades, a companion casing section having a ring flange that coacts with said cylindrical casing part to coaxially aline them and that engages said ring-frame to hold the latter and said disc-like structure in position, said companion casing section having means for ingress of air and for passage of the air into the space above said Venturi-tubes and transverse diaphragm, and means operable from the exterior of the casing assembly for relatively shifting said blades to carry the number of Venturi-tubes exposed to receive air through the diaphragm opening.

13. In apparatus of the class described, in combination, casing means having an internally stepped cylindrical part, a grid-like structure comprising two superimposed disc-like parts received in said casing part and seated on an annular step thereof, said structure having distributed throughout a substantial area thereof many vertical Venturi-tube passages therethrough with their axes parallel to each other and with the narrowest parts of their throats lying substantially in the plane of the junction of said two disc-like parts, at least one contiguous face of the latter being depressed about said tube passages to form a distributed liquid-fuel reservoir, said structure having jet passages leading from said reservoir to said Venturi-tube passages at substantially the throats of the latter, said casing means carrying externally thereof a fuel float-chamber having communication through the wall of said cylindrical part with said reservoir, a ring-frame received in said cylindrical casing part and seated against the uppermost of said disc-like parts, said ring-frame carrying a plurality of movable overlapped blades forming a transverse diaphragm that overlies said Venturi-tubes and provides a variable opening that is coaxial with said cylindrical part and said grid structure, said casing means having means for the ingress of air and for passage of the air into the space above said Venturi-tubes and transverse diaphragm, and means operable from the exterior of the casing means for relatively shifting said blades to vary the number of Venturi-tubes exposed to receive air through the diaphragm opening.

14. In apparatus of the class described, in combination, casing means having a wall forming a flow passage with air influx orifice means at one end and efflux passage means at the other end, said wall having an internal seat thereabout, two superimposed parts received therein and seated against said seat and thereby positioned transversely of said flow passage, said two parts having a plurality of Venturi-tube passages therethrough with their axes parallel and with the narrow portions of their throats lying substantially in the plane of the junction of said two parts, at least one of the contiguous faces thereof being depressed about said tube passages to form a distributed liquid-fuel containing cavity with jet passages leading from the cavity to said tube passages at substantially the throats thereof, means for holding said two parts together and against said seat, and means for feeding liquid-fuel from an exterior source of supply to said cavity.

15. An apparatus as claimed in claim 14 in which the peripheral face of said superimposed parts is contiguous to the inside face of said wall, said fuel feeding means comprising a peripheral channel in one of said contiguous faces having connection with said source of supply and passage means leading thereto from said cavity.

16. An apparatus as claimed in claim 14 in which the peripheral face of said superimposed parts and the inside face of said wall are contiguous, said contiguous wall face having therein a peripheral channel having connection with said source of supply, at least one of said contiguous faces of said superimposed parts having channel means therein closed over by the other contiguous face and leading from said cavity to the peripheral face thereof and terminating at said peripheral channel.

17. An apparatus as claimed in claim 16 in which a gasket is interposed between said seat and the adjacent one of said superimposed Venturi-tube containing parts, said means for holding the latter against said seat operating to compress said gasket to maintain a seal against leakage of liquid fuel toward said efflux passage means of said casing means.

18. An apparatus as claimed in claim 14 provided with an open frame seated against that one of said superimposed parts that is remote from said seat, said frame supporting movable means that provide a variable opening for the passage of air from said air influx to Venturi-tubes of said parts, said holding means comprising means operating upon said frame and through it upon said superimposed parts to hold them against said seat.

19. In apparatus of the class described, in combination, means forming a flow passage of substantial cross-sectional area and flow capacity and having air influx orifice means and efflux orifice means with transverse diaphragm means intermediate of said two orifice means having a variable flow opening the plane of which is transverse of said flow passage, the latter having therein a transverse member presenting a face closely adjacent said plane and having a large number of Venturi-tube passages therethrough terminating in said face, each of very small capacity relative to that of said flow passage and all extending in the direction of flow in said flow passage, said tube passages having at their respective throats liquid-fuel jet passages adapted to be supplied with liquid fuel from a suitable source for fuel spray into the tubes in response to Venturi-tube pressure differentials caused by air flow through the tubes, and means remotely-controllable and operating upon said transverse diaphragm to change the area of said opening to increase or decrease the number of tube-passages encompassed within the projected area of the opening as the latter is increased or decreased and thereby vary production of fuel-vapor and air mixture in small increments or decrements, said Venturi-tube passages having a pattern of arrangement in said transverse member in relation to the change in perimeter of said opening as the area of the latter is changed by said last-mentioned means that provides intersection by a line of the projected perimeter with a progression of Venturi-tubes in addition to such tubes as are fully encompassed within the projected area of the opening whereby the tubes of said progression are made partially effective and are preconditioned for prompt full action upon further increase in area of the opening.

20. An apparatus as claimed in claim 19 in which the variable diaphragm opening is circular in area and the pattern of arrangement of Venturi-tube passages in said transverse member is substantially spiral.

21. In apparatus of the class described, in combination, a casing section having an internally stepped cylindrical part of substantial diameter, a disc-like structure received in said cylindrical casing part and seated on an annular step thereof to extend transversely of said casing part and having a plurality of vertical Venturi-tube passages therethrough with their axes parallel to each other, said disc-like structure having an internal transverse liquid-fuel receiving cavity transversed by said tubes and connected with the latter by jet passages through the walls thereof substantially at their throats, means for feeding liquid-fuel from the exterior of the casing to said cavity, a ring-frame received in said cylindrical casing part and seated adjacent the periphery of said disc-like structure, said ring-frame carrying a plurality of movable coacting blades forming a transverse diaphragm that overlies said plurality of Venturi-tubes and provides a variable opening for influx of air to tubes wholly and partially uncovered by the blades, a companion casing section having a ring flange that coacts with said cylindrical casing part to coaxially aline them and that engages said ring-frame to hold the latter and said disc-like structure in position, said companion casing section having means for ingress of air and for passage of the air into the space above said Venturi-tubes and transverse diaphragm, said ring-frame having associated therewith a spider terminating in a blade-control ring coaxial with said ring-frame and said control ring having mechanical connections to shift said blades in response to rotary movement of the control ring to vary the diaphragm opening, said ring flange of said companion casing section having a yoke bridging thereacross above said spider and the latter and said yoke having at their centers the respective elements of a two-part bearing structure that are interengageable upon assembly of said companion casing section to said first casing section, and means operable from the exterior for rotatively shifting said control ring.

22. In apparatus of the class described, in combination, means forming a flow passage of substantial cross-sectional area and flow capacity and having air influx orifice means and efflux orifice means with transverse diaphragm means intermediate of said two orifice means having a variable flow opening the plane of which is transverse of said flow passage, the latter having therein a transverse member presenting a face closely adjacent said plane and having a large number of Venturi-tube passages there-through terminating in said face, each of very small capacity relative to that of said flow passage and all extending in the direction of flow in said flow passage, said transverse member having an internal transverse liquid-fuel receiving cavity traversed by said tubes and connected with the latter by jet passages through the walls thereof substantially at their throats, means for feeding liquid-fuel to said cavity, and means remotely-controllable and operating upon said transverse diaphragm to change the area of said opening to increase or decrease the number of tube passages encompassed within the projected area of the opening as the latter is increased or decreased and thereby vary production of fuel-vapor and air mixture in small increments or decrements.

23. An apparatus as claimed in claim 22 in which said transverse member comprises two superimposed parts having contiguous faces the plane of which is substantially coincident with the plane of the throats of said tube passages, said internal fuel-receiving cavity being in the form of a transverse depression in at least one of said contiguous faces and about the tube passages.

24. An apparatus as claimed in claim 22 in which said transverse member comprises two superimposed parts having contiguous faces the plane of which is substantially coincident with the plane of the throats of said Venturi-tube passages whereby the diverging walls of the latter extend in opposite directions from the plane of the respective faces that are contiguous in the assembly of said two parts.

25. An apparatus as claimed in claim 22 in which said jet passages through the walls of the many Venturi-tube passages comprise channel-like recesses in at least one of said contiguous faces to overlie the tube-wall thicknesses in the other face.

26. In apparatus of the class described, in combination, means forming a flow-passage of substantial cross-sectional area and flow capacity and having air influx orifice means and efflux orifice means with means forming, intermediate of said two orifice means, an internal peripheral seat having in a wall thereof a peripherally extending liquid-fuel supply passage, a grid-like structure comprising two superimposed disc-like parts received in said seat and thereby positioned transversely across said flow passage, said structure having distributed throughout a central area thereof many vertical Venturi-tube passages therethrough with their axes parallel and with the narrow parts of their throats lying substantially in the plane of the junction of said two disc-like parts, at least one contiguous face of the latter being depressed about said tube passages to form a distributed liquid-fuel reservoir, said structure having jet passages leading from said reservoir to said Venturi-tube passages at substantially the throats of the latter and having fuel passage means extending from said reservoir and opening into said peripheral liquid-fuel supply passage in said seat for receiving liquid fuel from the latter.

27. In apparatus of the class described, in combination, means forming a flow-passage of substantial cross-sectional area and flow capacity and having air influx orifice means and efflux orifice means with means forming, intermediate of said two orifice means, an internal peripheral seat having in a wall thereof a peripherally extending liquid-fuel supply passage, a member received in said seat and extending transversely of the flow passage, said member having a large number of Venturi-tube passages therethrough, each of small capacity relative to that of the flow passage and all extending in a direction transverse of the member and thereby adapted to extend in the direction of flow in said flow passage, said member having an internal transverse liquid-fuel receiving cavity traversed by said tubes and connected with the latter by jet passages through the walls thereof substantially at their throats and having peripherally distributed fuel passages extending from said cavity and opening into said peripheral fuel passage means in said seat for receiving liquid fuel from the latter.

28. An apparatus as claimed in claim 27 in which said transverse member comprises two superimposed parts having contiguous faces the plane of which is substantially coincident with the plane of the throats of said tube passages, said internal fuel-receiving cavity being in the form of a transverse depression in at least one of said contiguous faces and about the tube passages and said peripherally distributed fuel passages comprise channels in one of said contiguous faces.

29. A sub-assembly for interposing in a round flow passage between an air-influx and a fuel-vapor and air mixture efflux orifice comprising a grid-like structure comprising two superimposed disc-like parts adapted to be received transversely across said flow passage, said structure having distributed throughout a central area thereof many vertical Venturi-tube passages therethrough with their axes parallel and with the narrow parts of their throats lying substantially in the plane of the junction of said two disc-like parts, at least one contiguous face of the latter being depressed about said tube passages to form a distributed liquid-fuel reservoir, said structure having jet passages leading from said reservoir to said Venturi-tube passages at substantially the throats of the latter, a ring-frame seated against and adjacent the periphery of the uppermost of said disc-like parts, said ring-frame carrying a plurality of movable overlapped blades forming a transverse diaphragm that overlies said Venturi-tubes in said central area of said grid-like structure and provides a variable opening, and a blade-control ring coaxial with said ring-frame and having mechanical connections to shift the blades in response to rotary movement of the control ring to vary the diaphragm opening.

30. An apparatus as claimed in claim 29 in which the distribution of said Venturi-tube in said grid-like structure is substantially along a spiral and the variable opening formed by said overlapping blades is circular.

31. In apparatus of the class described, in combination, casing means having a wall forming a flow passage with air influx orifice means at one end and efflux passage means at the other end, said wall having an internal seat thereabout, two superimposed parts received therein and seated against said seat and thereby positioned transversely of said flow passage, said two parts having a plurality of air passages therethrough each of materially lesser capacity than that of said flow passage, at least one of the contiguous faces thereof being depressed about said air passages to form a distributed liquid fuel containing cavity with jet passages leading from the cavity to said air passages, an open frame seated against that one of said superimposed parts that is remote from said seat, said frame supporting a plurality of relatively movable blades forming a transverse diaphragm that overlies said air passages and provides a variable opening for selectively varying the number of air passages that are to receive air from said air influx means, means for controlling movement of said blades, and means for feeding liquid-fuel from an exterior source of supply to said cavity.

32. An apparatus as claimed in claim 31 in which said blade-controlling means comprises an open control frame substantially overlying said first-mentioned open frame and having mechanical connections to shift said blades in response to movement of said control frame, said casing means comprising a lower casing section of which said wall is a part and an upper casing section, said two casing sections having means for securing them together, said blade-control means comprising mechanism carried by said upper casing section and operable from the exterior thereof, and means forming a readily connectable operating connection between said mechanism and said control frame.

33. In apparatus of the class described, in combination, a casing section having a cylindrical wall forming an air flow passage of substantial capacity and having therein a transverse member that has a large number of relatively small air passages therethrough, each of small capacity relative to that of said flow passage and all extending in the direction of flow in said flow passage, said member having an internal transverse liquid-fuel receiving cavity traversed by the walls of said air passages and connected with the latter by jet passages through their walls, means for feeding liquid fuel from the exterior of the casing section to said cavity, a ring frame coaxial with said cylindrical wall and carrying a plurality of movable coacting blades forming a transverse diaphragm that overlies said air passages and provides a variable opening to increase or decrease the number of air passages encompassed within the projected area of the opening, a companion casing section having a ring flange that coacts with said cylindrical wall to coaxially align the two casing sections and has means coacting to hold said ring-frame in position, a blade-control ring having mechanical connections to shift said blades in response to rotary movement of the control ring to vary the diaphragm opening, and means comprising two members respectively carried by said blade-control ring and by said companion casing section and adapted for inter-engagement, upon assembly of said companion casing section to said first casing section, to coact to form a rotational bearing support for said control-ring.

34. An apparatus as claimed in claim 33 provided with means operable from the exterior for rotatively shifting said control ring, said last mentioned means comprising a mechanism carried by said companion casing section and means forming a driving connection between said mechanism and that one of said two bearing members that is carried by said control-ring.

35. In apparatus of the class described, in combination, a casing section having a cylindrical wall forming an air flow passage of substantial capacity and having therein a transverse member that has a large number of relatively small air passages therethrough, each of small capacity relative to that of said flow passage and all extending in the direction of flow in said flow passage, said member having an internal transverse liquid-fuel receiving cavity traversed by the walls of said air passages and connected with the latter by jet passages through their walls, means for feeding liquid fuel from the exterior of the casing section to said cavity, a ring frame coaxial with said cylindrical wall and carrying a plurality of movable coacting blades forming a transverse diaphragm that overlies said air passages and provides a variable opening to increase or decrease the number of air passages encompassed within the projected area of the opening, a companion casing section having a ring flange that coacts with said cylindrical wall to coaxially align the two casing sections and has means coacting to hold said ring-frame in position and has extending radially therefrom an annular wall supporting wall means forming therewith an annular chamber having an outer apertured cylindrical wall for air influx and an inner apertured cylindrical wall for air efflux to the region above said air passages and diaphragm, an air-filtering medium between said apertured cylindrical walls, and means operable from the exterior for shifting said diaphragm blades, said last mentioned means comprising a two-part mechanism of which one part has operative connections with said blades with a driving member accessible in the aforesaid region and the other part comprises a mechanism carried by said companion casing section and provided with a driven member accessible at the aforesaid region, with means forming a driving connection between said driven member and said driving member.

References Cited in the file of this patent

UNITED STATES PATENTS

| | | |
|---|---|---|
| 1,207,681 | Broderick | Dec. 5, 1916 |
| 1,542,933 | Gepfert et al. | June 23, 1925 |
| 1,829,632 | Chanard | Oct. 27, 1931 |
| 2,296,697 | Ball | Sept. 22, 1942 |
| 2,479,852 | McDonnell | Aug. 23, 1949 |
| 2,543,105 | Harrison | Feb. 27, 1951 |
| 2,588,474 | Bellios | Mar. 11, 1952 |
| 2,638,330 | Morgenroth | May 12, 1953 |